(12) United States Patent
Towata

(10) Patent No.: US 8,665,473 B2
(45) Date of Patent: Mar. 4, 2014

(54) PRINTING SYSTEM, CONTROL METHOD, STORAGE CLIENT APPARATUS, AND WEB APPLICATION SERVER

(75) Inventor: Hiroaki Towata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/119,708

(22) PCT Filed: Jan. 26, 2011

(86) PCT No.: PCT/JP2011/052076
§ 371 (c)(1),
(2), (4) Date: Mar. 17, 2011

(87) PCT Pub. No.: WO2011/102218
PCT Pub. Date: Aug. 25, 2011

(65) Prior Publication Data
US 2013/0010324 A1    Jan. 10, 2013

(30) Foreign Application Priority Data

Feb. 22, 2010  (JP) .................................. 2010-036667

(51) Int. Cl.
*G06F 15/00* (2006.01)
(52) U.S. Cl.
USPC ......................................................... 358/1.15
(58) Field of Classification Search
USPC .......................................................... 358/1.15
See application file for complete search history.

(56) References Cited

U.S. PATENT DOCUMENTS

2013/0050735 A1*  2/2013  Nuggehalli et al. .......... 358/1.13

FOREIGN PATENT DOCUMENTS

| JP | 2002-169671 A | 6/2002 |
| JP | 2005-020582 A | 1/2005 |
| JP | 2005-311808 A | 11/2005 |
| JP | 2006-099714 A | 4/2006 |
| JP | 2006-252321 A | 9/2006 |
| JP | 2007-004217 A | 1/2007 |

* cited by examiner

*Primary Examiner* — Saeid Ebrahimi Dehkordy
(74) *Attorney, Agent, or Firm* — Canon USA, Inc., IP Division

(57) ABSTRACT

A printing system includes a web application server, a storage client apparatus, and a printing apparatus to save the storage capacity. The storage client provides stored bibliographic information data to a web application server and, when the storage client apparatus acquires print instruction from the web application server, the storage client apparatus provides data, to be stored in the storage client apparatus, to the web application server in response to a provision request from the web application server. The printing apparatus acquires and prints corresponding data after acquiring a print request from the web application server. The web application server manages information of the storage client apparatus and the printing apparatus, sends display data to a client apparatus operated by a user, and acts on storage, print, and query requests.

16 Claims, 22 Drawing Sheets

FIG. 6

```
PUT http://print-sv.queue.net/dev_0001queue/messages
? VisitilityTimeout=30
, messagettl=3600
x-ms-date : Mon, 14 Sep 2009 17:00:25 GMT
········MESSAGE DATA CONTENTS········
<message>
<request id= '0001' />
<document id= 'd_00001'
documentURI=http://print-sv.biob.net/dev_0001/document/document_001.doc/>
<result storedURI=http://print-sv.biob.net/dev_0001/printdata/pdl_0001' />
</message>
```

FIG. 7A

| PRINTING APPARATUS ID | COUNTRY | AREA | COLOR/MONOCHROME PRINTING | DOUBLE/SINGLE-SIDED PRINTING | PREVIOUS ACCESS |
|---|---|---|---|---|---|
| xxx | JAPAN | TOKYO | Color | DOUBLE-SIDED PRINTING | 2009/10/01/ 22:10:50 |
| yyy | USA | New York | BW | DOUBLE-SIDED PRINTING | 2009/10/01/ 22:10:55 |
| zzz | JAPAN | KYOTO | Color | SINGLE-SIDED PRINTING | 2009/10/01/ 22:10:52 |

| DOCUMENT DATA ID | REQUEST NAME | APPARATUS ID |
|---|---|---|
| AAA | UPLOAD REQUEST | xxx |
| AAA | URL PRINT REQUEST | yyy |
| BBB | UPLOAD REQUEST | xxx |
| BBB | URL PRINT REQUEST | zzz |
| CCC | DIRECT PRINT REQUEST | zzz |

| DOCUMENT DATA ID | TITLE | FILE SIZE | USER WHO STORED DOCUMENT DATA | STORAGE DATE / TIME | STORAGE CLIENT APPARATUS ID | URL |
|---|---|---|---|---|---|---|
| AAA | sample_scan1.pdf | 310KB | userA | 2009/09/29 | xxx | |
| BBB | sample_scan2.pdf | 320KB | userA | 2009/09/29 | xxx | |
| CCC | sample_scan3.pdf | 330KB | userA | 2009/09/30 | yyy | |
| DDD | sample_scan4.pdf | 340KB | userA | 2009/09/30 | yyy | |
| EEE | sample_scan5.pdf | 310KB | userB | 2009/09/01 | xxx | |
| FFF | sample_scan6.pdf | 320KB | userB | 2009/09/02 | xxx | |
| GGG | sample_scan7.pdf | 330KB | userB | 2009/09/03 | zzz | |

600

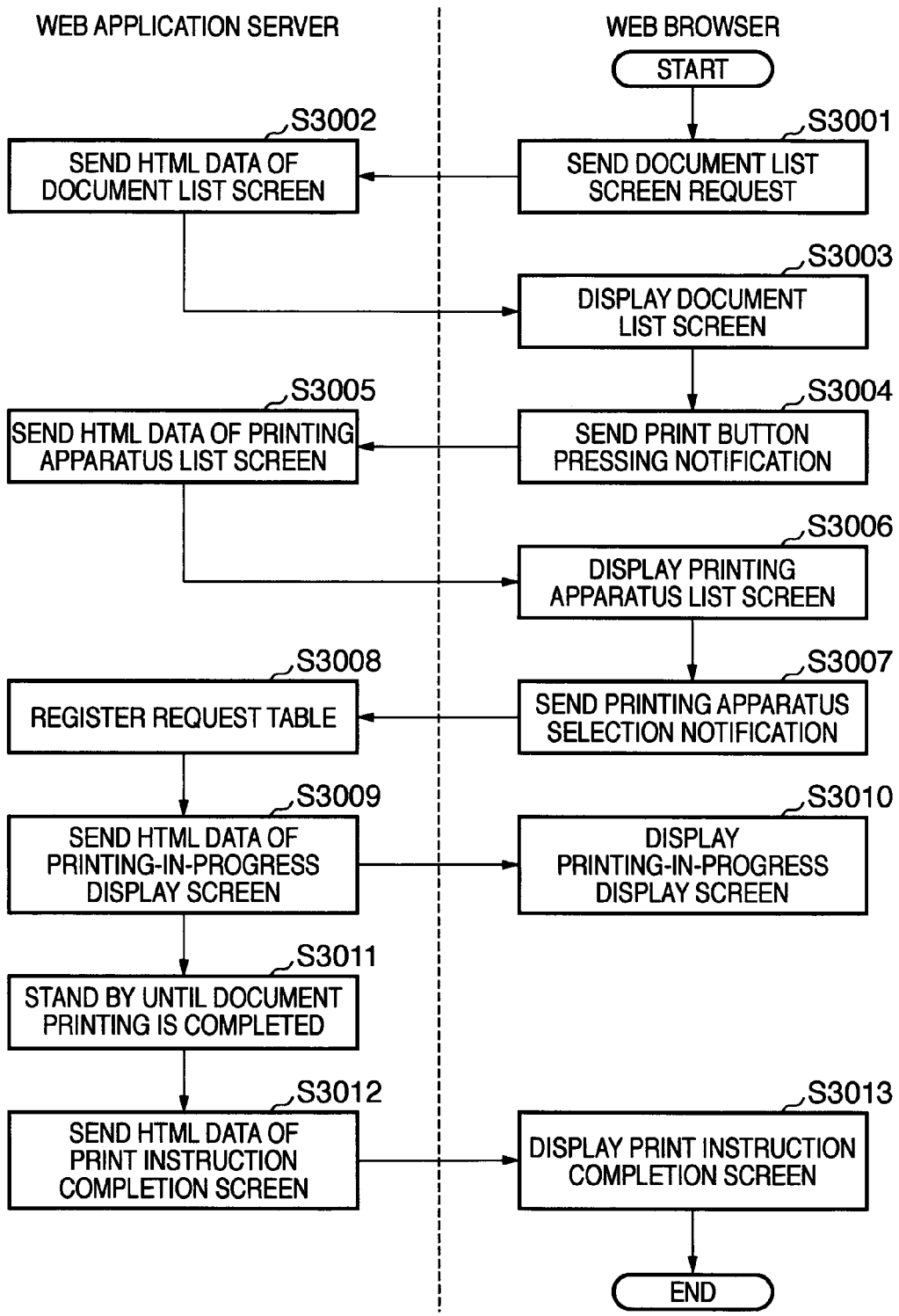
F I G. 12

FIG. 13A

| TITLE | FILE SIZE | USER WHO STORED DOCUMENT DATA | STORAGE DATE / TIME | STORAGE CLIENT APPARATUS ID | PRINT BUTTON |
|---|---|---|---|---|---|
| Sample_scan1.pdf | 310KB | userA | 2009/09/29 | xxx | PRINT |
| Sample_scan2.pdf | 320KB | userA | 2009/09/29 | xxx | PRINT |
| Sample_scan3.pdf | 330KB | userA | 2009/09/30 | yyy | PRINT |
| Sample_scan4.pdf | 340KB | userA | 2009/09/30 | yyy | PRINT |
| Sample_scan5.pdf | 310KB | userB | 2009/09/01 | xxx | PRINT |
| Sample_scan6.pdf | 320KB | userB | 2009/09/02 | xxx | PRINT |
| Sample_scan7.pdf | 330KB | userB | 2009/09/03 | zzz | PRINT |

F I G. 16
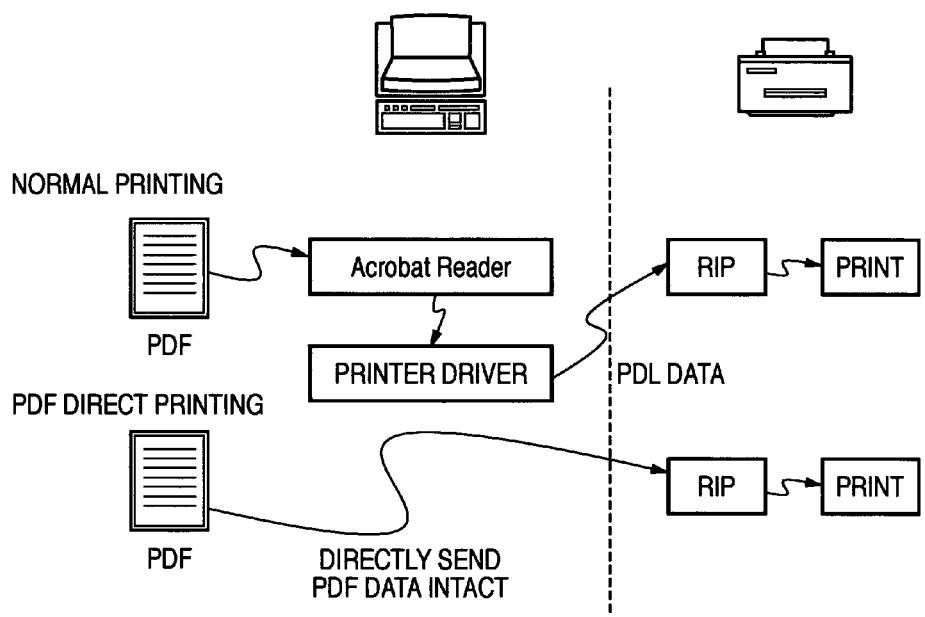

FIG. 18A

Web Browser

FILE   EDIT   VIEW   FAVORITE   TOOL   HELP

ADDRESS

| TITLE | FILE SIZE | USER WHO STORED DOCUMENT DATA | STORAGE DATE / TIME | STORAGE CLIENT APPARATUS ID | PRINT BUTTON |
|---|---|---|---|---|---|
| Sample_scan1.pdf | 310KB | userA | 2009/09/29 | xxx | PRINT |
| Sample_scan2.pdf | 320KB | userA | 2009/09/29 | xxx | PRINT |
| Sample_scan3.pdf | 330KB | userA | 2009/09/30 | yyy | PRINT |
| Sample_scan4.pdf | 340KB | userA | 2009/09/30 | yyy | PRINT |
| Sample_scan5.pdf | 310KB | userB | 2009/09/01 | xxx | PRINT |
| Sample_scan6.pdf | 320KB | userB | 2009/09/02 | xxx | PRINT |
| Sample_scan7.pdf | 330KB | userB | 2009/09/03 | zzz | PRINT |

FIG. 18B

| STORAGE CLIENT APPARATUS ID | PREVIOUS ACCESS |
|---|---|
| PPP | 2009 / 10 / 01/ 22 : 10 : 50 |
| QQQ | 2009 / 10 / 01/ 22 : 10 : 55 |
| RRR | 2009 / 10 / 01/ 22 : 10 : 52 |

1300

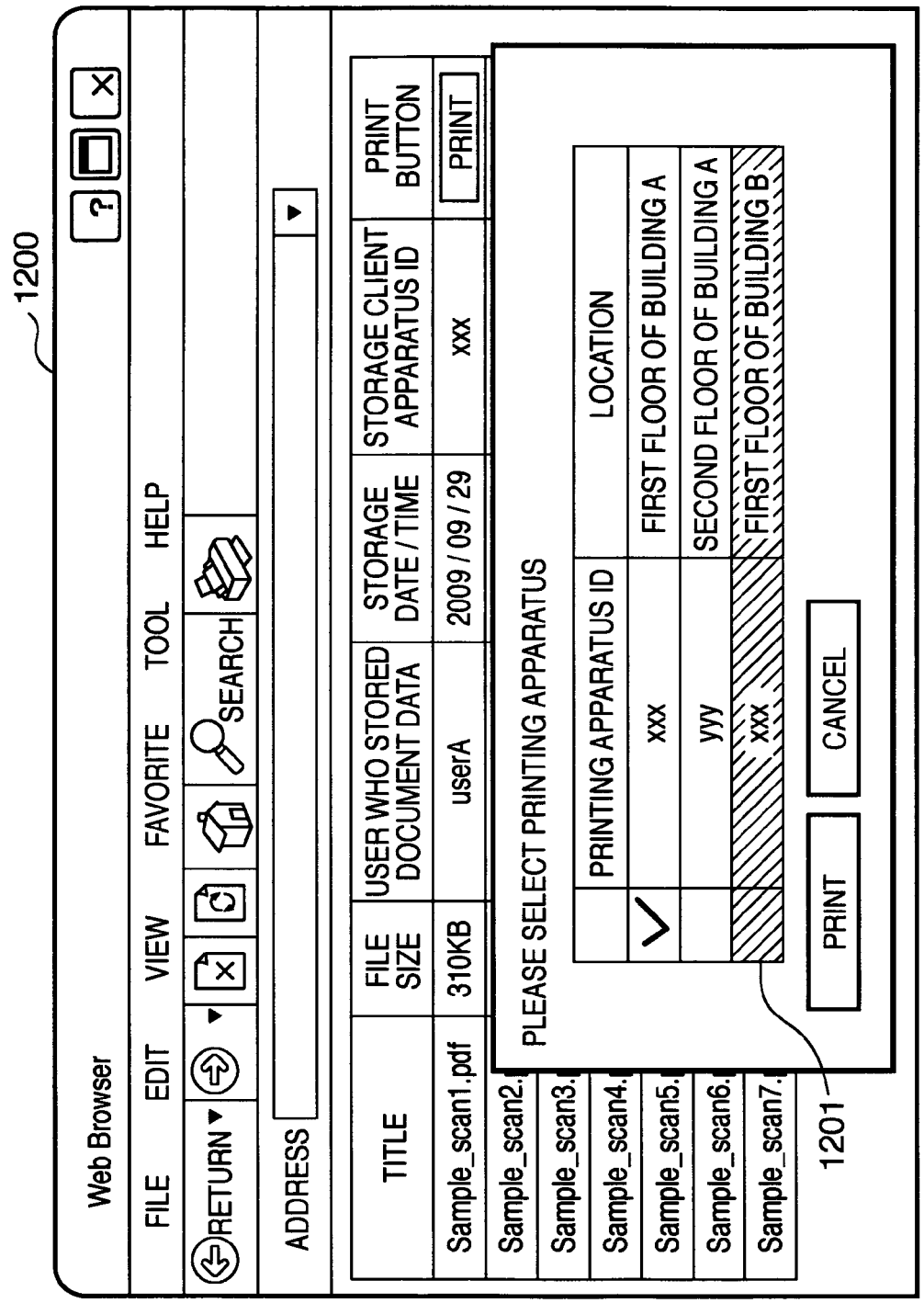

PRINTING SYSTEM, CONTROL METHOD, STORAGE CLIENT APPARATUS, AND WEB APPLICATION SERVER

CROSS REFERENCE TO RELATED APPLICATIONS

This application is a National Stage filing of PCT application No. PCT/JP2011/052076, filed Jan. 26, 2011, which claims priority from Japanese Patent Application No. 2010-036667, filed Feb. 22, 2010, all of which are hereby incorporated by reference herein in their entirety.

TECHNICAL FIELD

The present invention relates to a printing system and control method which share data when a print request is issued, in order to save the storage capacity of an apparatus which holds data to be shared.

BACKGROUND ART

A form in which a web application provided by a web application server is used via a web browser of a client apparatus without installing an application on the client apparatus is becoming prevalent. Such a web application includes a document management web application which systematically manages documents created by the client apparatus.

A form in which a server group managed in a centralized manner by others is used without directly managing a web application server by a web application provider is also becoming prevalent. Such a form is called cloud computing. In cloud computing, the web application provider is charged in proportion to the amount of HDD usage and CPU usage of the web application server. In this form, the web application provider is charged a large sum of money for usage charges when he or she stores and manages all documents on the client apparatus in the above-mentioned document management web application. These usage charges are indirectly collected from the users, so their financial burden becomes relatively heavy. Also, when documents sent from a large number of client apparatus are stored in the document management web application, the network load becomes considerably heavy. Hence, only the bibliographic information of the documents is stored in the document management web application instead of storing the actual data of the documents in it in that case. On the other hand, a prior art in which an apparatus such as a portable terminal instructs a printing apparatus to print a document stored in the document management web application by designating its URL has been proposed (see, for example, Japanese Patent Laid-Open No. 2002-169671).

SUMMARY OF INVENTION

As described above, in the web application service which uses cloud computing, only the bibliographic information of the documents are stored in the document management web application instead of storing the actual data of the documents in it in consideration of the charges incurred in proportion to the amount of data used and the network load. On the other hand, in the prior art disclosed in, for example, Japanese Patent Laid-Open No. 2002-169671, an apparatus such as a portable terminal instructs a printing apparatus to print a document stored in the document management web application by designating its URL. However, when only the bibliographic information is stored in the web application server, no document data is present on the document management web application. Hence, the client apparatus cannot instruct the printing apparatus to print a document by designating its URL. The present invention solves this problem.

According to one aspect of the present invention, there is provided a printing system including a web application server which holds data in a storage area and which is charged in proportion to an amount of usage of the storage area, a storage client apparatus, and a printing apparatus, characterized in that the storage client apparatus comprises providing means for providing bibliographic information of data stored in the storage client apparatus to the web application server, and query means for inquiring the web application server of a print instruction to print data stored in the storage client apparatus, the providing means further provides data to be stored in the storage client apparatus to the web application server in response to a provision request from the web application server when the print instruction is acquired by the query means, the printing apparatus comprises print request query means for inquiring the web application server of a print request to the printing apparatus, and printing means for acquiring and printing corresponding data based on information described in the print request when the print request is acquired by the print request query means, and the web application server comprises storage client apparatus management means for managing information of the storage client apparatus, printing apparatus management means for managing information of the printing apparatus, bibliographic information management means for managing bibliographic information of the data, sending means for sending display data used to display the bibliographic information of the data to a client apparatus operated by a user, request management means for managing a data provision request to the storage client apparatus and a print request to the printing apparatus, in response to a print request issued from the client apparatus to the printing apparatus to print the data stored in the storage client apparatus, request notification means for notifying the storage client apparatus of the provision request and storage location information if the provision request to the storage client apparatus is held in the request management means, in response to a query for the provision request issued by the query means of the storage client apparatus, addition means for adding the storage location information of the data to be printed to the bibliographic information of the data when the data is provided from the storage client apparatus, and print request notification means for notifying the printing apparatus of the print request and storage location information of the data if the print request to the printing apparatus is held in the request management means, in response to a query for the print request issued by the print request query means of the printing apparatus.

According to another aspect of the present invention, there is provided a storage client apparatus in a printing system including a web application server which holds data in a storage area and which is charged in proportion to an amount of usage of the storage area, the storage client apparatus, and a printing apparatus, characterized by comprising providing means for providing bibliographic information of data stored in the storage client apparatus to the web application server, and query means for inquiring the web application server of a print instruction to print data stored in the storage client apparatus, wherein the providing means further provides data to be stored in the storage client apparatus to the web application server in response to a provision request from the web application server when the print instruction is acquired by the query means.

According to another aspect of the present invention, there is provided a printing apparatus in a printing system including a web application server which holds data in a storage area and which is charged in proportion to an amount of usage of the storage area, a storage client apparatus, and the printing apparatus, characterized by comprising print request query means for inquiring the web application server of a print request to the printing apparatus, and printing means for acquiring and printing corresponding data based on information described in the print request when the print request is acquired by the print request query means.

According to another aspect of the present invention, there is provided a web application server in a printing system including the web application server which holds data in a storage area and which is charged in proportion to an amount of usage of the storage area, a storage client apparatus, and a printing apparatus, characterized by comprising storage client apparatus management means for managing information of the storage client apparatus, printing apparatus management means for managing information of the printing apparatus, bibliographic information management means for managing bibliographic information of the data, sending means for sending display data used to display the bibliographic information of the data to a client apparatus operated by a user, request management means for managing a data provision request to the storage client apparatus and a print request to the printing apparatus, in response to a print request issued from the client apparatus to the printing apparatus to print the data stored in the storage client apparatus, request notification means for notifying the storage client apparatus of the provision request and storage location information if the provision request to the storage client apparatus is held in the request management means, in response to a query for the provision request issued by the query means of the storage client apparatus, addition means for adding the storage location information of the data to be printed to the bibliographic information of the data when the data is provided from the storage client apparatus, and print request notification means for notifying the printing apparatus of the print request and storage location information of the data if the print request to the printing apparatus is held in the request management means, in response to a query for the print request issued by the print request query means of the printing apparatus.

According to another aspect of the present invention, there is provided a control method in a printing system including a web application server which holds data in a storage area and which is charged in proportion to an amount of usage of the storage area, a storage client apparatus, and a printing apparatus, characterized by comprising the step of: in the storage client apparatus, providing bibliographic information of data stored in the storage client apparatus to the web application server, and inquiring the web application server of a print instruction to print data stored in the storage client apparatus, the providing step in which data to be stored in the storage client apparatus is further provided to the web application server in response to a provision request from the web application server when the print instruction is acquired by the query means, in the printing apparatus, inquiring the web application server of a print request to the printing apparatus, and acquiring and printing corresponding data based on information described in the print request when the print request is acquired, and in the web application server, managing information of the storage client apparatus, managing information of the printing apparatus, managing bibliographic information of the data, sending display data used to display the bibliographic information of the data to a client apparatus operated by a user, managing a data provision request to the storage client apparatus and a print request to the printing apparatus, in response to a print request issued from the client apparatus to the printing apparatus to print the data stored in the storage client apparatus, notifying the storage client apparatus of the provision request and storage location information if the provision request to the storage client apparatus is held, in response to a query for the provision request issued by the storage client apparatus, adding the storage location information of the data to be printed to the bibliographic information of the data when the data is provided from the storage client apparatus, and notifying the printing apparatus of the print request and storage location information of the data if the print request to the printing apparatus is held, in response to a query for the print request issued by the printing apparatus.

Even in an arrangement in which only the bibliographic information of document data is present on the web application server and each client apparatus holds the document data, the user can instruct the printing apparatus to print the document data using a web application.

Further features of the present invention will become apparent from the following description of exemplary embodiments with reference to the attached drawings.

BRIEF DESCRIPTION OF DRAWINGS

FIG. 6 is a view for explaining a REST message according to the first embodiment;

FIGS. 7A, 7B, and 7C are tables for explaining tables according to the first embodiment;

FIG. 12 is a flowchart showing the sequence of issuing a print instruction according to the first embodiment;

FIGS. 13A and 13B are views for explaining UI screens according to the first embodiment;

FIG. 16 is a block diagram for explaining PDF direct printing according to the first embodiment;

FIGS. 18A and 18B are views for explaining a management screen and a table according to the third embodiment; and FIG. 19 is a view for explaining a printing apparatus selection screen with printing limitations according to the third embodiment.

DESCRIPTION OF EMBODIMENTS

Best modes for carrying out the present invention will be described below with reference to the accompanying drawings.

First Embodiment

[System Configuration]

Figure 1:
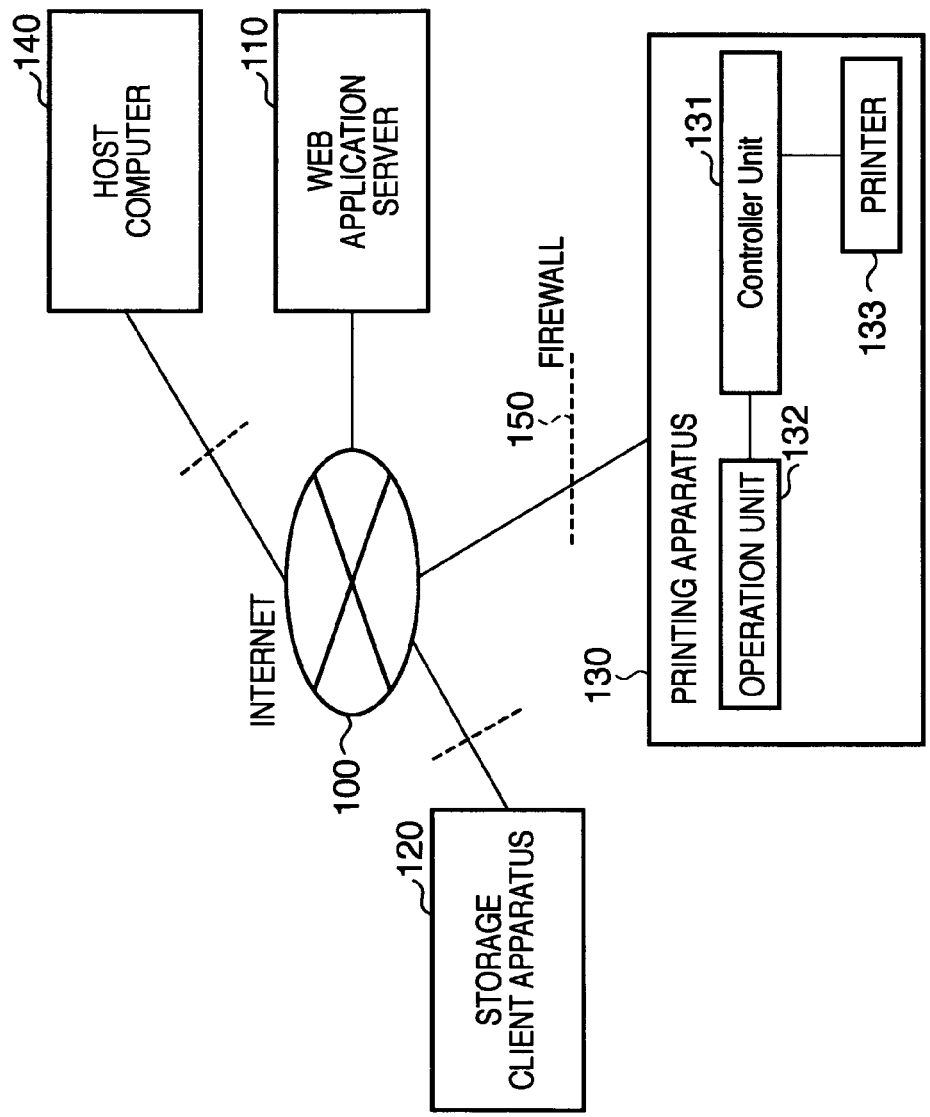
FIG. 1 is a block diagram for explaining a system configuration according to the first embodiment.

FIG. 1 is a block diagram showing the entire configuration of a printing system according to the first embodiment of the present invention. A software process group for providing a function of managing, for example, document data stored in a storage client apparatus 120 using a web browser 141 shown in FIG. 4 from a host computer 140 runs on a web application server 110. The web application server 110 is connected to the Internet 100. A printing apparatus 130 is an MFP (Multi Function Peripheral) which performs image input/output, image sending/reception, and various types of image processing. The printing apparatus 130 includes a printer 133 serving as an image output device, a controller unit 131, and an operation unit 132. The printer 133 and operation unit 132 are connected to the controller unit 131. The controller unit 131 controls the printer 133 and operation unit 132. The printing apparatus 130 is connected to the Internet 100.

Figure 4:
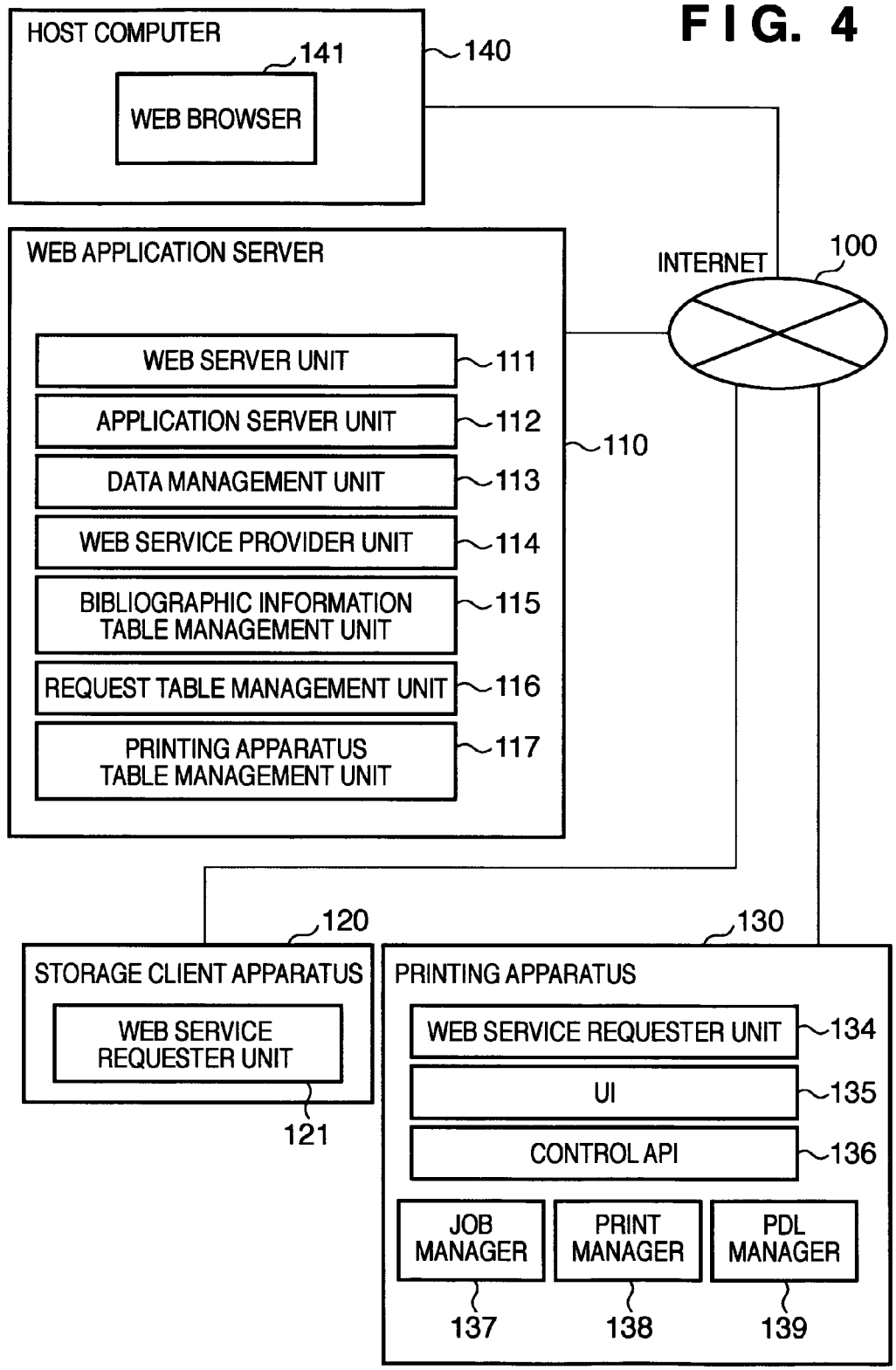
FIG. 4 is a block diagram showing the software configuration of the information processing apparatus according to the first embodiment.

The host computer 140 includes the web browser 141 shown in FIG. 4, and is connected by HTTP to the web application server 110 to be able to receive a service provided by it. Examples of the host computer 140 are a PC (Personal Computer), a PDA (Personal Digital Assistant), and a mobile phone. Alternatively, the host computer 140 may be a printing apparatus. The host computer 140 is connected to the Internet 100.

The storage client apparatus 120 includes a storage to store document data, and can be connected to the Internet 100. An example of the document data is data in PDF files. The web application server 110 systematically manages document data stored in a plurality of storage client apparatuses 120. The storage client apparatus 120 is often the host computer 140 or printing apparatus 130. Firewalls 150 limit access from the outside via the Internet 100 in order to enhance the security of the printing apparatus 130.

[Hardware Configuration of Web Application Server 110, Host Computer 140, and Storage Client Apparatus 120]

Figure 2:
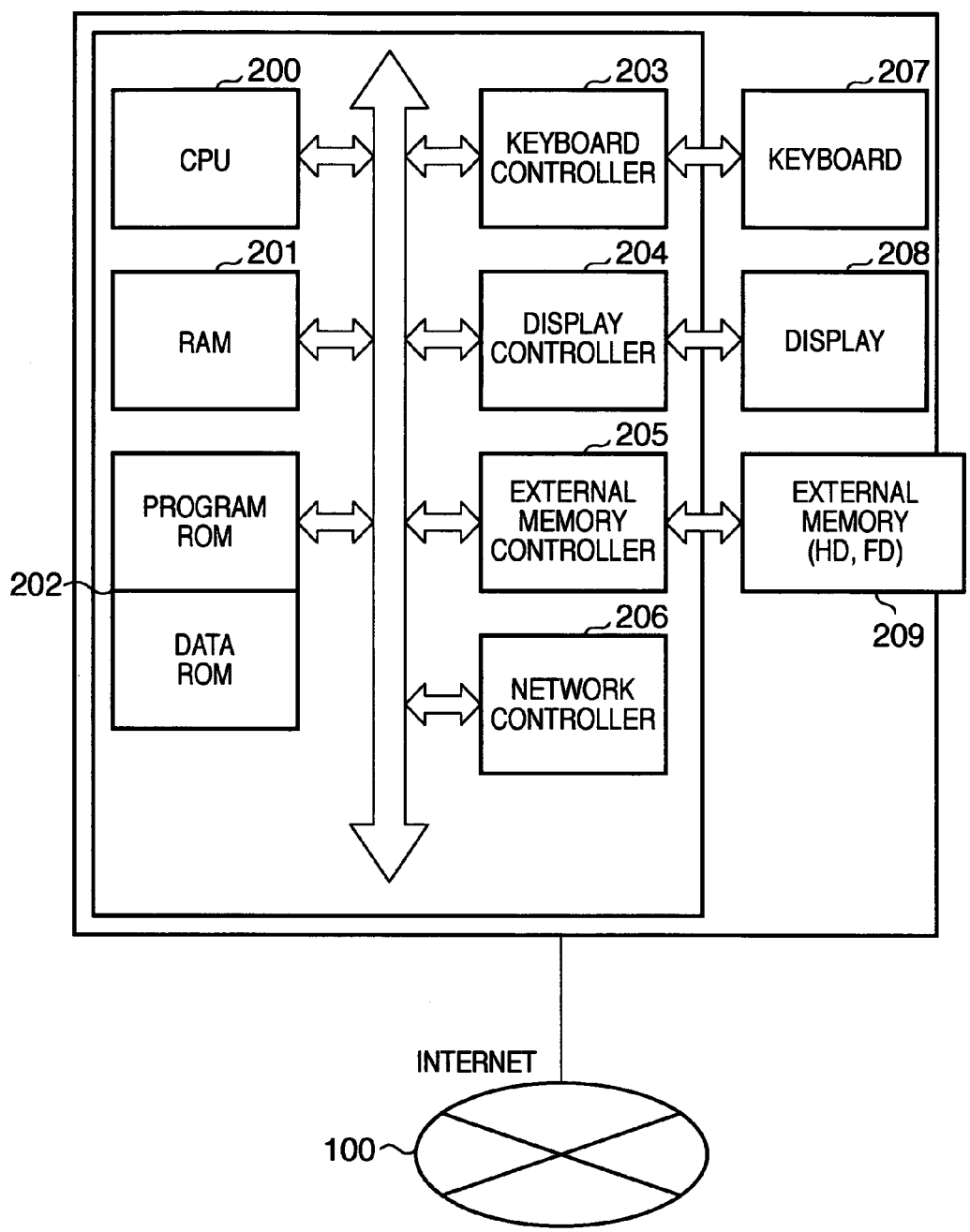
FIG. 2 is a block diagram showing the hardware configuration of an information processing apparatus according to the first embodiment.

FIG. 2 is a block diagram illustrating an example of the hardware configuration of the host computer 140, web application server 110, and storage client apparatus 120 which constitute the system according to the embodiment of the present invention. The hardware configuration shown in FIG. 2 corresponds to that of a general information processing apparatus. Hence, the hardware configuration of a general information processing apparatus is applicable to the host computer 140, web application server 110, and storage client apparatus 120 in this embodiment, and the present invention is not limited to the configuration shown in FIG. 2.

Referring to FIG. 2, a CPU 200 executes programs such as an OS and application which are stored in a program ROM of a ROM 202 or loaded into a RAM 201 by an external memory 209. Note that the OS is an abbreviation for an operating system running on a computer, and an operating system will be referred to as an OS hereinafter. The CPU 200 executes processing in each flowchart to be described later. The RAM 201 functions as, for example, the main memory and work area of the CPU 200. A keyboard controller 203 controls key input from a keyboard 207 and a pointing device (not shown). A display controller 204 controls display on various types of displays 208. An external memory controller 205 controls data access in, for example, the external memory (HDD) 209 and a Floppy® disk (FD) which store various types of data. A network controller 206 is connected to the Internet 100 to execute processing for controlling communication with other apparatuses connected to the Internet 100.

Note that in this embodiment, a service for which the user is charged in proportion to the amount of usage of the storage area is assumed with regard to the use of the web application server 110.

[Hardware Configuration of Printing Apparatus 130]

Figure 3:
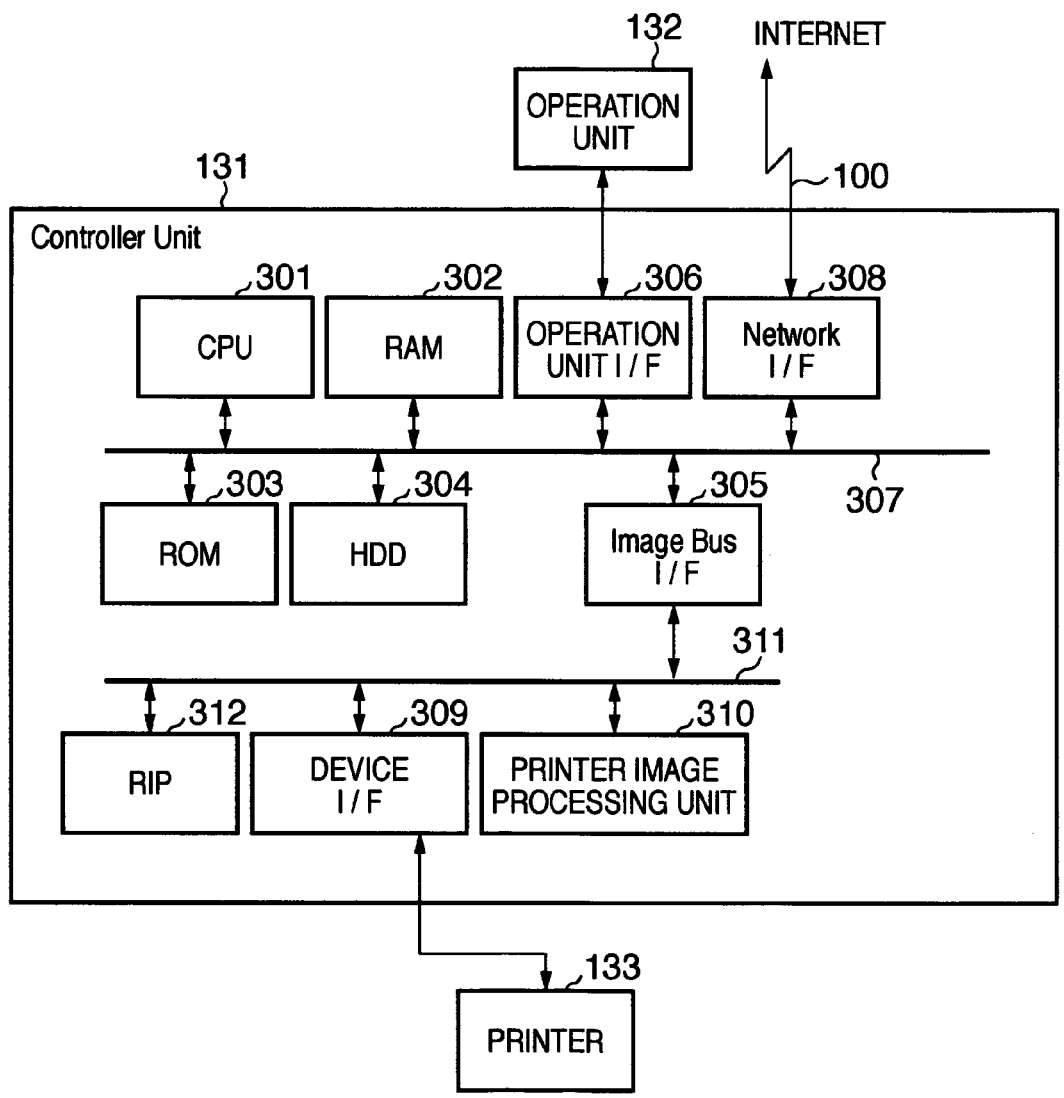
FIG. 3 is a block diagram showing the hardware configuration of a printing apparatus according to the first embodiment.

The configuration of the printing apparatus 130 will be described next with reference to FIG. 3. FIG. 3 is a block diagram showing the detailed configuration of the printing apparatus 130 shown in FIG. 1. The printing apparatus 130 includes the controller unit 131 which controls the entire apparatus, as shown in FIG. 3. The controller unit 131 controls the printer 133 serving as an image output device, and is connected to the Internet 100 via a wired/wireless line to input/output image information and device information via them.

The controller unit 131 includes a CPU 301. The CPU 301 is connected to a RAM 302, ROM 303, HDD (Hard Disk Drive) 304, image bus I/F 305, operation unit I/F 306, and network I/F 308 via a system bus 307. The RAM 302 is a memory for providing a working area to the CPU 301. The RAM 302 is also used as an image memory for temporarily storing image data. The ROM 303 is a boot ROM. The ROM 303 stores a system boot program. The HDD 304 stores, for example, system software and image data.

The operation unit I/F 306 is an interface for inputting/outputting information to/from the operation unit 132, and plays a role in, for example, outputting image data displayed on the operation unit 132 to the operation unit 132 and transmitting information input via the operation unit 132 by the user to the CPU 301. The network I/F 308 is connected to the Internet 100 via the firewall 150, and inputs/outputs information to/from the Internet 100. The image bus I/F 305 is a bus bridge which connects the system bus 307 and an image bus 311 that transfers image data at high speed to each other to convert the data structure.

The image bus 311 is connected to a RIP (Raster Image Processor) 312, device I/F 309, and printer image processing unit 310. The RIP 312 rasterizes a PDL code received from a network into a bitmap image. The device I/F 309 connects the printer 133 and the controller unit 131 to each other to convert image data by a synchronous system/asynchronous system. The printer image processing unit 310 performs, for example, printer correction and resolution conversion for print output image data.

[Software Configuration]

The software configuration of the web application server 110, printing apparatus 130, host computer 140, and storage client apparatus 120 will be described next with reference to FIG. 4.

The web application server 110 includes a web server unit 111, application server unit 112, data management unit 113, web service provider unit 114, bibliographic information table management unit 115, request table management unit 116, and printing apparatus table management unit 117. These constituent elements are present as program files stored in the external memory 209 of the web application server 110. The above-mentioned program files are loaded into the RAM 201 by the OS and modules which use its modules, and executed by the CPU 200. The web server unit 111 accepts an HTTP request from the web browser 141 of the host computer 140 via the Internet 100, and sends back an HTTP response corresponding to the request to the host computer 140.

The application server unit 112 is invoked from the web server unit 111 in response to the HTTP request to execute processing. The application server unit 112 sends back a dynamically generated HTML to the web server unit 111 as the processing result. The data management unit 113 manages data which requires persistence. The web service provider unit 114 sends web service responses to web service requests from the storage client apparatus 120 and printing apparatus 130. The bibliographic information table management unit 115 manages the bibliographic information of document data on the storage client apparatus 120. Thus, a bibliographic information management means is implemented. The request table management unit 116 generates and manages requests to the storage client apparatus 120 and printing apparatus 130 in response to a print request sent from the host computer 140. Thus, a request management means is implemented. The printing apparatus table management unit 117 manages printing apparatus information sent by the printing apparatus 130 upon issuing a printing apparatus register request. Thus, a printing apparatus management means is implemented.

The storage client apparatus 120 includes at least a web service requester unit 121. The web service requester unit 121 sends the bibliographic information of a document to the web service provider unit 114 of the web application server 110. Also, the web service requester unit 121 sends a print request query to the web service provider unit 114 of the web application server 110. Examples of the storage client apparatus 120 are the host computer 140 and printing apparatus 130. The storage client apparatus 120 corresponds to all apparatuses, each of which includes the web service requester unit 121 and can store a document in the external memory 209.

The printing apparatus 130 includes, for example, a user interface (to be abbreviated as a UI hereinafter) 135, web service requester unit 134, control API 136, job manager 137, print manager 138, and PDL manager 139. These constituent elements are present as program files stored in the HDD 304 of the printing apparatus 130. The above-mentioned program files are loaded into the RAM 302 by the OS and modules which use its modules, and executed by the CPU 301.

In the printing apparatus 130, the UI 135 serves as a module which mediates between the apparatuses and the user operations in performing various types of operations/settings for the printing apparatus 130. The UI 135 is used to perform, for example, processing requests or data settings by transferring the input information to various types of modules (to be described later), in accordance with the user operations. The web service requester unit 134 sends a print request query to the web service provider unit 114 of the web application server 110. The control API 136 provides an interface for modules such as the job manager 137 to modules such as the web service requester unit 134. The dependences among the various types of modules are reduced, thereby making it possible to enhance the availabilities of these individual modules.

The job manager 137 interprets various kinds of processing instructed by the above-mentioned various types of modules via the control API 136, and issues an instruction to each module. Also, the job manager 137 performs centralized management of hardware processing executed in the printing apparatus 130. The print manager 138 manages/controls printing processing instructed by the job manager 137. The PDL manager 139 performs PDL conversion of document data designated by the job manager 137.

The printing apparatus table management unit 117 in the web application server 110 manages the printing apparatus ID of the printing apparatus 130, its installation location information such as the country and area, its capability information such as color/monochrome printing and double/single-sided printing. The printing apparatus 130 may include the web browser 141 (to be described later). The host computer 140 includes, for example, the web browser 141. The web browser 141 is present as a program file stored in the external memory 209 of the host computer 140. The above-mentioned program file is loaded into the RAM 201 by the OS and modules which use its modules, and executed by the CPU 200. The web browser 141 is displayed on the display 208, and receives key input from the keyboard 207 or a pointing device (not shown) by the user. Also, the web browser 141 is connected by HTTP to the web application server 110 via the Internet 100 to receive a service provided by it.

[Server Computer Group 160]

Figure 5:
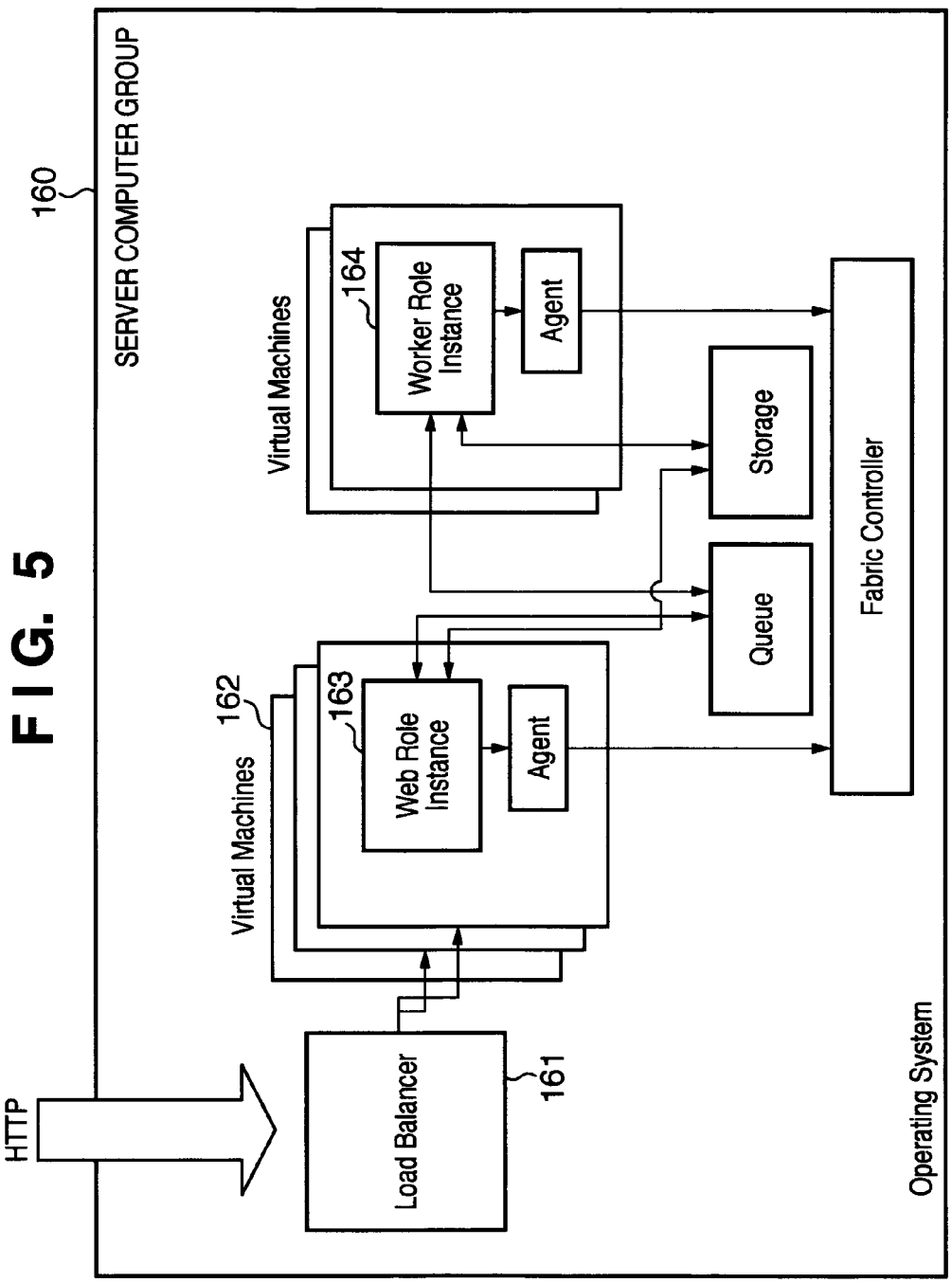
FIG. 5 is a block diagram for explaining a server computer group according to the first embodiment.

The web application server 110 in the present invention is sometimes provided by virtual machines 162 provided by a server computer group 160 shown in FIG. 5. In this configuration, communication with the storage client apparatus 120 and printing apparatus 130 is HTTP communication, a load balancer 161 assigns communication to each virtual machine, and a web role instance 163 makes a response. Communication is mainly performed by REST and web services. FIG. 6 illustrates an example of a REST message. A worker role instance 164 is invoked from the web role instance 163 as needed, in executing processing which requires much time.

[Printing Apparatus Table 400 of Web Application Server 110]

A printing apparatus table 400 managed by the printing apparatus table management unit 117 in the web application server 110 will be described next with reference to FIG. 7A. The printing apparatus table 400 is a data table for holding data in association with the printing apparatus ID of the printing apparatus 130, its installation location information, and its capability information such as color/monochrome printing and double/single-sided printing. The installation location information and capability information of the printing apparatus 130 in the printing apparatus table 400 are used as printing apparatus search information when the user selects a desired printing apparatus on a web application provided by the web application server 110. Note that the configuration of the printing apparatus table presented herein is merely an example, and the present invention is not limited to this configuration. Accordingly, necessary information may be added and deleted as needed.

[Request Table 500 of Web Application Server 110]

A request table 500 managed by the request table management unit 116 in the web application server 110 will be described next with reference to FIG. 7B. A request means herein an instruction issued to each printing apparatus to process a job. Also, in this embodiment, the request table management unit 116 implements a request management means. The request table 500 is generated/updated by invoking the request table management unit 116 by the web service provider unit 114 of the web application server 110 in response to a print request from the host computer 140. The apparatus ID is the ID of the printing apparatus 130 or storage client apparatus 120 that is the destination to which various types of requests are sent. The request name indicates the request type corresponding to the apparatus ID. With this information, a target printing apparatus or storage client apparatus is uniquely identified and managed. The request type includes an "Upload Request", a "URL Print Request", and a "Direct Print Request". The web application server 110 cannot directly send a request to the printing apparatus 130 or storage client apparatus 120 which is shielded by the firewall 150. Hence, upon receiving a request query from the printing apparatus 130 or storage client apparatus 120, the web application server 110 sends a request as a response to the request query. The upload request means issuing a request to provide data to be printed to the storage client apparatus 120. The URL print request means issuing a request to the printing apparatus 130 to print data, to be printed, by looking up a URL serving as the storage location information of this data. The direct print request means issuing a request to the printing apparatus 130 to print data, to be printed, by directly acquiring this data. By looking up these request names, the type of request associated with the data to be printed is managed.

Upon receiving a request query from the storage client apparatus 120 or printing apparatus 130, the web application server 110 searches the request table 500 for a request associated with the corresponding apparatus ID. If the request type is an upload request, a character string indicating to that effect, and an upload destination URL (Uniform Resource Locator) that is the storage location information are sent as a response to the request query. If the request type is a URL print request, a character string indicating to that effect, and the download destination URL are sent. If the request type is a direct print request, a character string indicating to that effect, and the ID of document data to be printed are sent.

(First Sequence)

Figure 8:
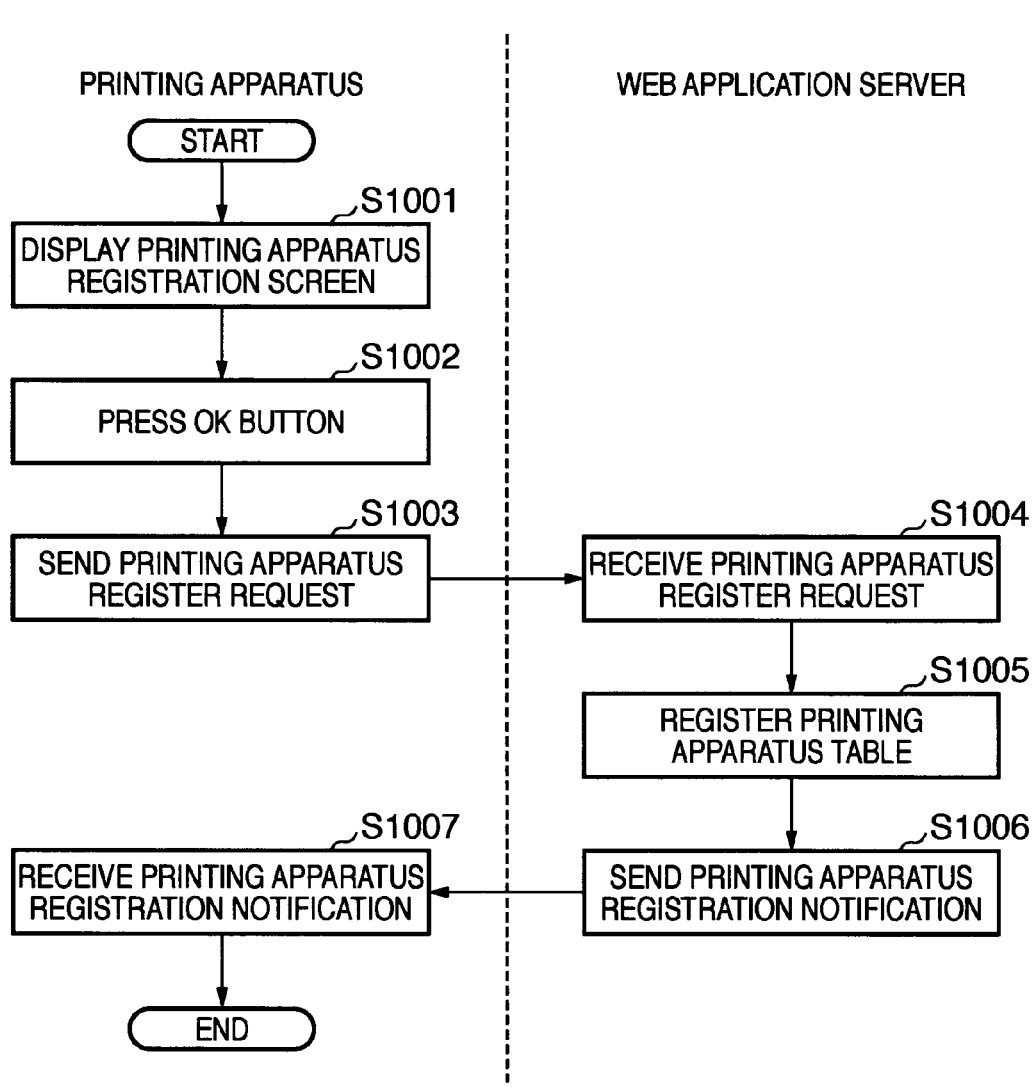
FIG. 8 is a flowchart showing the sequence of registering printing apparatus information according to the first embodiment.

A first sequence according to this embodiment will be described with reference to FIG. 7A and a flowchart shown in FIG. 8. The first sequence is the sequence of processing for registering information of the printing apparatus 130 in the web application server 110. The first sequence is executed only once in order to start the use of the web application server 110 in setting the printing apparatus 130. The registered printing apparatus information is used to allow the user to select a printing apparatus 130 for which a print instruction is issued from the web application server 110.

(Printing Management Table)

Data in the printing apparatus table 400 managed by the printing apparatus table management unit 117 in this embodiment will be described. Data 401 indicates that a printing apparatus, defined by a printing apparatus ID "xxx", a country "JAPAN", an area "TOKYO", a color/monochrome machine category "Color", a double/single-sided function category "Double-sided Printing", and a previous access date/time "2009/10/01/22:10:50", is registered in the printing apparatus table 400 of the web application server 110. Similarly, data 402 indicates that a printing apparatus, defined by a printing apparatus ID "yyy", a country "USA", an area "New York", a color/monochrome machine category "BW", a double/single-sided function category "Double-sided Printing", and a previous access date/time "2009/10/01/22:10:55", is registered in the printing apparatus table 400 of the web application server 110. Data 403 indicates that a printing apparatus, defined by a printing apparatus ID "zzz", a country "JAPAN", an area "KYOTO", a color/monochrome machine category "Color", a double/single-sided function category "Double-sided Printing", and a previous access date/time "2009/10/01/22:10:52", is registered in the printing apparatus table 400 of the web application server 110. By the first sequence shown in FIG. 8, the above-mentioned information is registered in the printing apparatus table 400. Also, the above-mentioned information is used as search information with which the user selects a printing apparatus 130 in the application on the web application server 110. Each item of the printing apparatus table 400 is not limited to the configuration in this embodiment, and more detailed information of the printing apparatus 130 can be stored as needed.

(Sequence of Printing Apparatus Registration)

Figure 9:
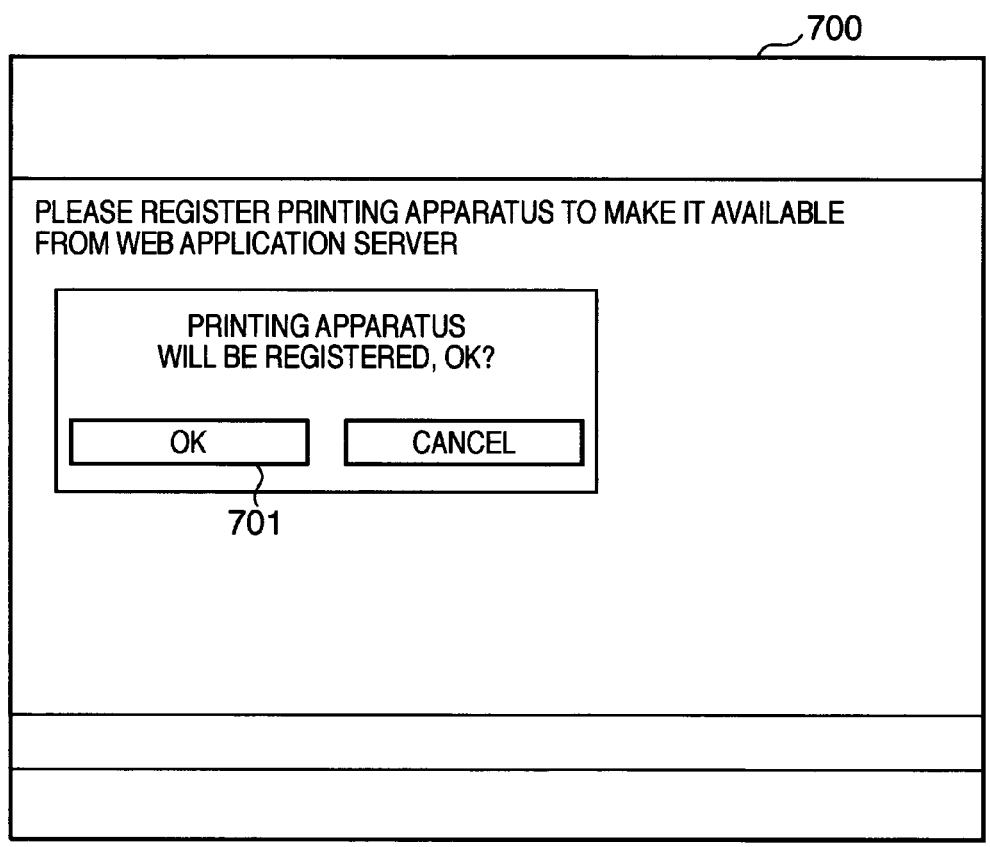
FIG. 9 is a view for explaining a printing apparatus registration screen according to the first embodiment.

The sequence of printing apparatus registration will be described next with reference to FIG. 8. First, in step S1001, the UI 135 of the printing apparatus 130 displays a printing apparatus registration screen 700 shown in FIG. 9. In step S1002, the user presses an OK button 701. The form, area layout, and control of the user interface shown in FIG. 9 are not limited to specific ones, and this user interface may take any form as long as it can implement necessary functions. In step S1003, the web service requester unit 134 of the printing apparatus 130 invokes the printing apparatus table management unit 117. The printing apparatus table management unit 117 sends back information of the printing apparatus 130 to the web service requester unit 134. The web service requester unit 134 issues a printing apparatus register request to the web application server 110. The printing apparatus register request contains the printing apparatus ID, printing apparatus position information, and printing apparatus capability information. The printing apparatus register request is issued by communication which uses, for example, SOAP.

In step S1004, the web service provider unit 114 of the web application server 110 receives the printing apparatus register request from the web service requester unit 134 of the printing apparatus 130. In step S1005, the web service provider unit 114 of the web application server 110 invokes the printing apparatus table management unit 117. The printing apparatus table management unit 117 acquires the information of the printing apparatus 130 based on the printing apparatus register request from the printing apparatus 130, and registers it in the printing apparatus table 400. In step S1006, the web service provider unit 114 of the web application server 110 sends a printing apparatus registration notification to the web service requester unit 134 of the printing apparatus 130. In step S1007, the web service requester unit 134 of the printing apparatus 130 receives the printing apparatus registration notification from the web service provider unit 114 of the web application server 110. As has been described above, by the first sequence, information of the printing apparatus 130 can be registered in the web application server 110.

(Sequence of Bibliographic Information Registration)

A second sequence according to this embodiment will be described next with reference to a flowchart shown in FIG. 10 and FIG. 11. The second sequence is the sequence of processing for registering, in a bibliographic information table 600 of the web application server 110, the bibliographic information of document data held in the storage client apparatus 120. In step S2001, the web browser 141 on the storage client apparatus 120 issues a request for HTML data that is display data of a document data registration screen 800 shown in FIG. 11 to the web server unit 111 of the web application server 110. In step S2002, the web server unit 111 of the web application server 110 receives the request for the HTML data of the document data registration screen 800.

In step S2003, the web server unit 111 of the web application server 110 sends the HTML data of the document data registration screen 800. Also in step S2003, the web browser 141 on the storage client apparatus 120 displays the document data registration screen 800. The document data presented on the document data registration screen 800 is stored in the storage client apparatus 120. In an example shown in FIG. 11, document data selected in a check box 801 is registered. In step S2005, when the user presses a register button 802 on the document data registration screen 800 shown in FIG. 11, the web service requester unit 121 of the storage client apparatus 120 sends the bibliographic information of the document data to the web service provider unit 114 of the web application server 110. In step S2006, the web service provider unit 114 of the web application server 110 receives the bibliographic information of the document data.

In step S2007, the web service provider unit 114 of the web application server 110 invokes the bibliographic information table management unit 115. The bibliographic information table management unit 115 registers the received bibliographic information in the bibliographic information table 600. In step S2008, the web service provider unit 114 of the web application server 110 sends a document data bibliographic information registration notification. In step S2009, the web on the storage client apparatus 120 receives the bibliographic information registration notification.

Figure 10:
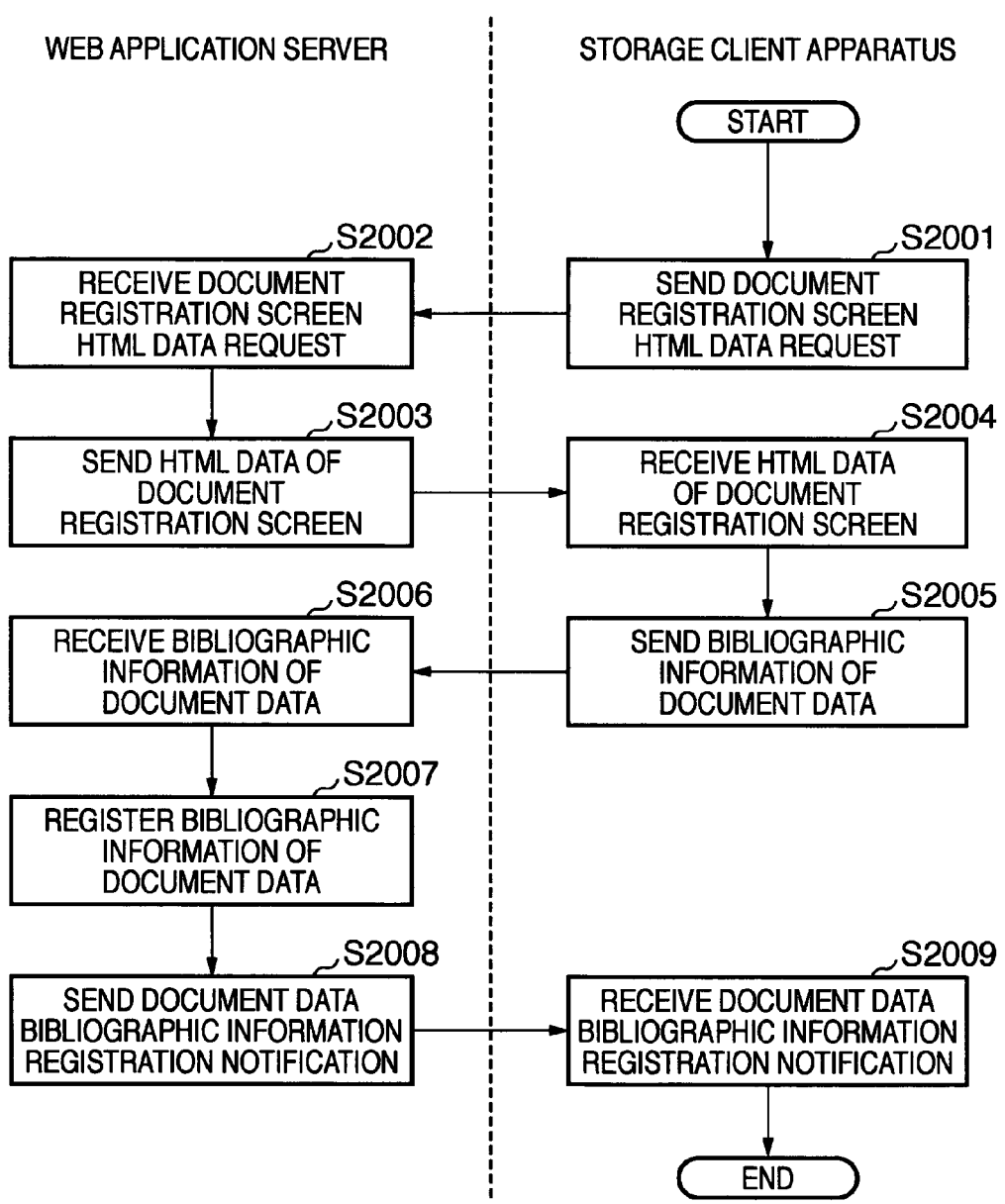
FIG. 10 is a flowchart showing the sequence of registering bibliographic information according to the first embodiment.
Figure 11:
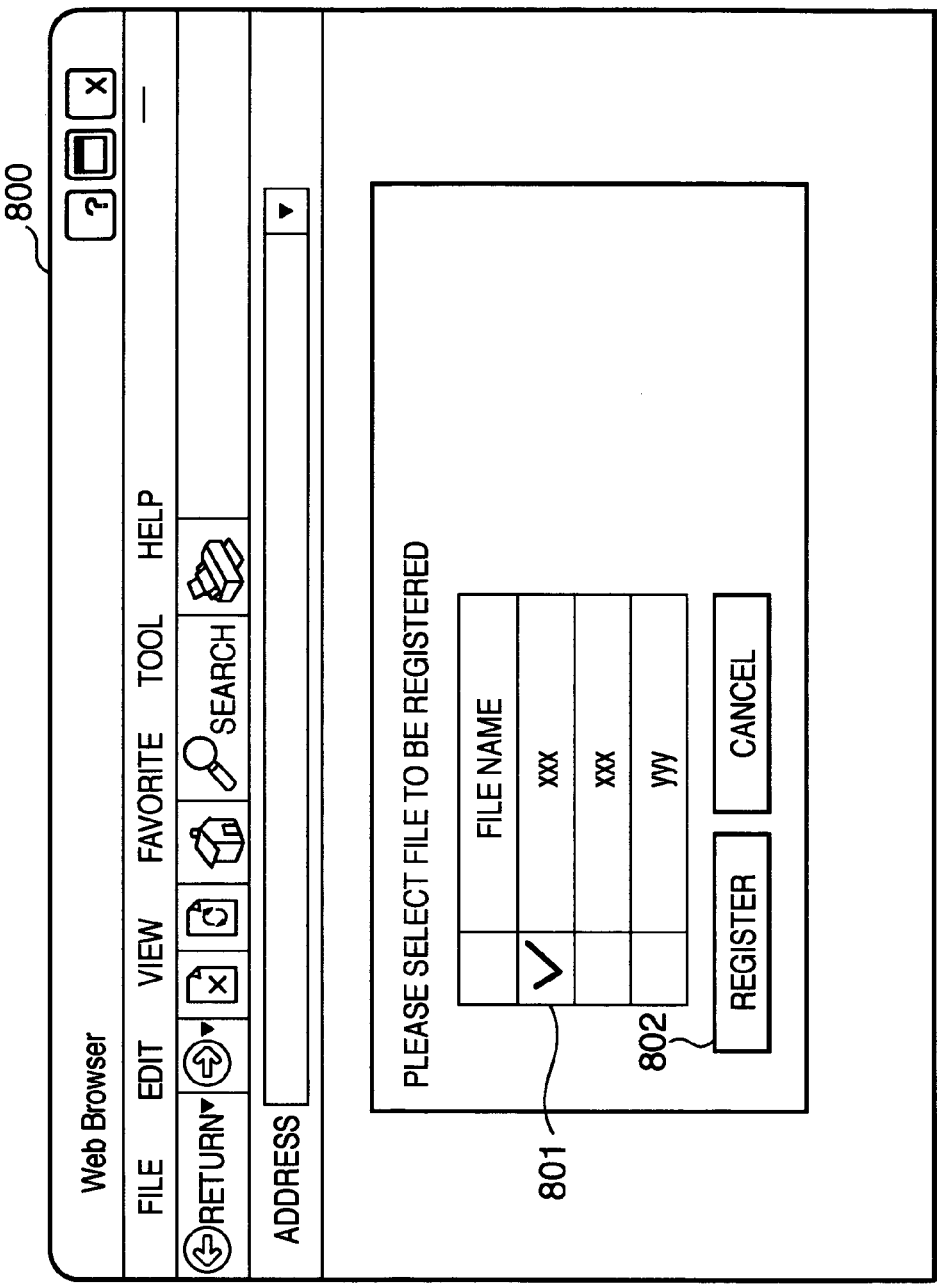
FIG. 11 is a view for explaining a document data bibliographic information registration screen according to the first embodiment.

In the sequence shown in FIG. 10, the user explicitly uploads the bibliographic information of document data into the web application server 110 in storing the document data. If the storage client apparatus 120 is not provided with the web browser 141, the web service requester unit 121 may automatically upload the bibliographic information of the stored document into the web application server 110.

As has been described above, by the second sequence, the bibliographic information of document data held in the storage client apparatus 120 can be registered in the bibliographic information table 600 of the web application server 110. In the foregoing way, the web application server 110 can systematically manage document data stored in each storage client apparatus 120.

(Sequence of Printing Execution Processing)

A third sequence will be described next with reference to a flowchart shown in FIG. 12 and FIG. 13A. The third sequence is the sequence of processing for allowing the user to send a print request to the printing apparatus 130 to the web application server 110 using the web browser 141 of the host computer 140 and execute printing. The third sequence starts as the user accesses the URL of a web application, provided by the web application server 110, via the web browser 141.

In step S3001, the web browser 141 sends a document list screen request to the web application server 110. At this time, HTTP communication is used. In step S3002, the web application server 110 sends the HTML data of a document list screen to the web browser 141. In step S3003, the web browser 141 displays a document data management screen 900 shown in FIG. 13A. The screen shown in FIG. 13A is used to allow the user to systematically manage documents stored in a plurality of storage client apparatuses 120. The form, area layout, and control of the management screen are not limited to specific ones, and this management screen may take any form as long as it can implement necessary functions.

Figure 13B:
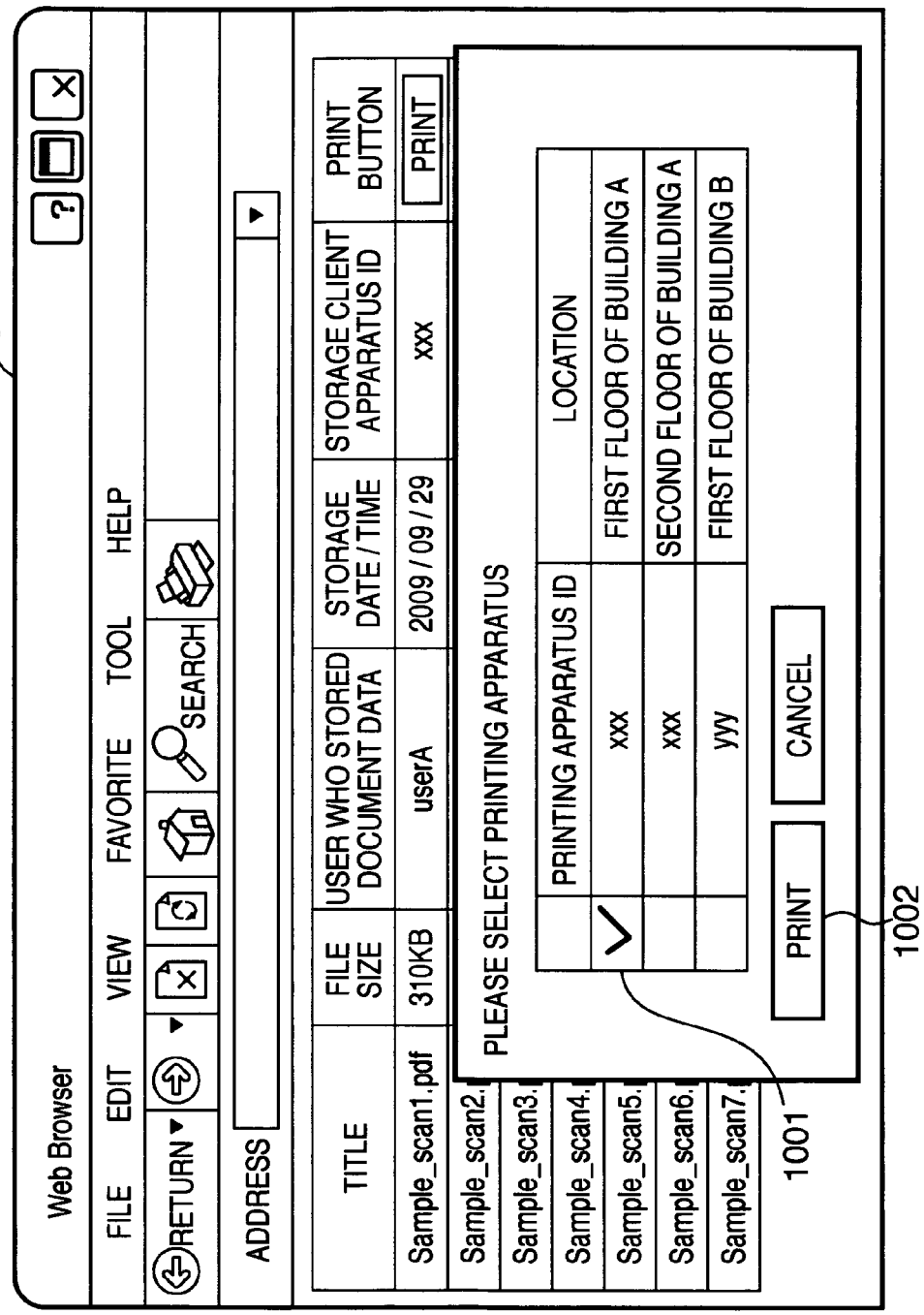

In step S3004, when the user presses a print button, the web browser 141 sends a print button pressing notification to the web application server 110. In step S3005, the web application server 110 sends the HTML data of a printing apparatus selection screen 1000 shown in FIG. 13B. The screen shown in FIG. 13A is used to allow the user to select a desired printing apparatus, and its form, area layout, and control are not limited to specific ones. Also, this screen may take any form as long as it can implement necessary functions.

In step S3006, the web browser 141 displays the printing apparatus selection screen 1000. In step S3007, when the user selects a printing apparatus in a check box 1001 and presses a print button 1002, the web browser 141 sends a printing apparatus selection notification to the web application server 110. In step S3008, the web application server 110 registers the request table 500. An upload request and a print request are registered in the request table. The upload request contains a character string indicating that the request type is an upload request, and the storage client apparatus ID. In this embodiment, a storage client apparatus management means is implemented using this storage client apparatus ID. The storage client apparatus ID is acquired from the bibliographic information table 600 shown in FIG. 7C, based on the document data ID selected by the user. The print request contains a character string indicating that the request type is a print request, and the printing apparatus ID selected by the user.

In step S3009, the web application server 110 sends the HTML data of a printing-in-progress display screen to the web browser 141. In step S3010, the web browser displays the printing-in-progress display screen. In step S3011, the web application server 110 stands by until a document print request is sent to the printing apparatus 130. The sending of a print request to the printing apparatus 130 is executed when the web application server 110 receives a request query from the printing apparatus 130. In step S3012, the web application server 110 sends the HTML data of a print instruction completion screen. The sending of the HTML data is asynchronously executed after the end of issuance of a print request to the printing apparatus 130. In step S3013, the web browser 141 displays the print instruction completion screen.

As has been described above, in the third sequence, the user can instruct a desired printing apparatus 130 to print a desired document on a web application provided by the web application server 110. By the third sequence, an upload request to the storage client apparatus 120 and a print request to the printing apparatus 130 are registered in the request table 500 of the web application server 110. The web application server 110 decides responses to request queries from the storage client apparatus 120 and printing apparatus 130, based on the request table 500.

(Sequence of Upload Request Query Processing)

Figure 14:
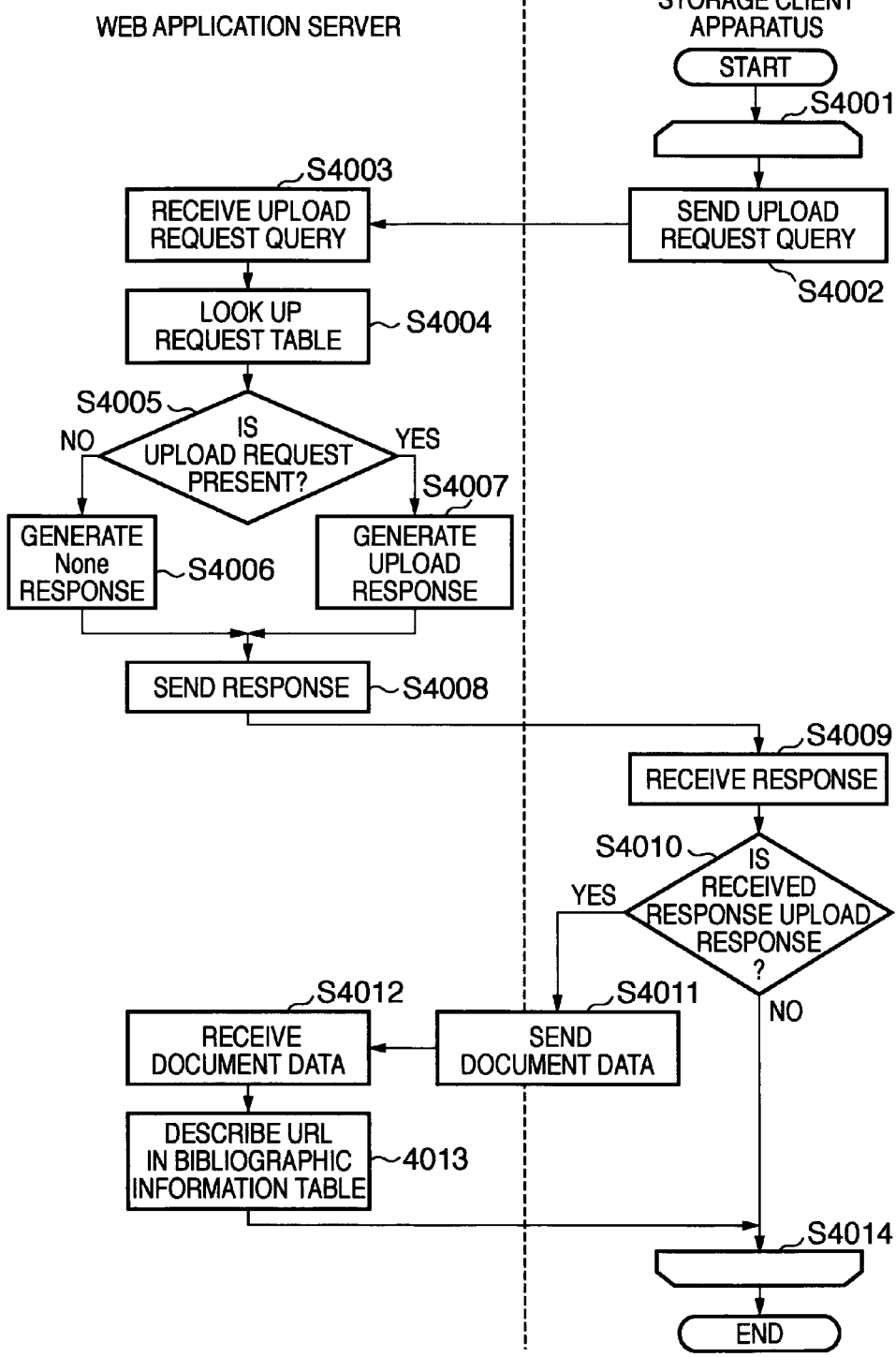
FIG. 14 is a flowchart showing the sequence of uploading document data according to the first embodiment.

A fourth sequence will be described next with reference to a flowchart shown in FIG. 14. The fourth sequence is the sequence of processing when the storage client apparatus 120 inquires the web application server 110 of an upload request at a predetermined cycle. By inquiring the web application server 110 of an upload request at a predetermined cycle, the storage client apparatus 120 can receive an upload instruction upon clearing the firewall.

In step S4001, the storage client apparatus 120 repeats the processes in steps S4002 to S4013. In step S4002, the web service requester unit 121 of the storage client apparatus 120 sends an upload request query to the web application server 110. That is, the storage client apparatus 120 confirms whether an upload request to itself is held in the web application server 110. The upload request query contains the storage client apparatus ID as information. In step S4003, the web application server 110 receives the upload request query from the web service requester unit 121 of the storage client apparatus 120.

In step S4004, the web service provider unit 114 of the web application server 110 invokes the request table management unit 116. The request table management unit 116 looks up the request table 500. In step S4005, the request table management unit 116 of the web application server 110 determines whether an upload request associated with the ID of the storage client apparatus which has sent the upload request query is present in the request table 500. If NO is determined in step S4005, the process advances to step S4006; or if YES is determined in step S4005, the process advances to step S4007.

In step S4006, the web service provider unit 114 of the web application server 110 generates a None response. The None response means a response indicating that no request to the storage client apparatus 120 is present. In step S4007, the web service provider unit 114 of the web application server 110 generates an upload response. The upload response contains a character string indicating that the request type is an upload request, and the upload destination URL.

In step S4008, the web service provider unit 114 of the web application server 110 sends the response generated in step S4006 or S4007 to the web service requester unit 121 of the storage client apparatus 120. Thus, a request notification means is implemented. In step S4009, the web service requester unit 121 of the storage client apparatus 120 receives the response. In step S4010, the web service requester unit 121 of the storage client apparatus 120 determines whether the received response is an upload response. If YES is determined in step S4010, the process advances to step S4011; or if NO is determined in step S4010, the process directly advances to step S4014.

In step S4011, the web service requester unit 121 of the storage client apparatus 120 sends document data to the upload destination URL on the web application server 110, which is contained in the upload response. In step S4012, the web service provider unit 114 of the web application server 110 receives the document data. At this time, the data management unit 113 of the web application server 110 stores the data in the external memory 209 serving as a storage area.

In step S4013, the web service provider unit 114 of the web application server 110 invokes the bibliographic information table management unit 115. The bibliographic information table management unit 115 registers the upload destination URL of the document data in the bibliographic information table 600. With the process in step S4013, the URL to which the printing apparatus 130 downloads the document data from the web application server 110 can be registered. In step S4014, the web application server 110 returns the process to step S4001.

As has been described above, by the fourth sequence shown in FIG. 14, the storage client apparatus 120 can upload document data into the web application server 110 and register its URL in the bibliographic information table as bibliographic information when a request to print data held in itself is present. Also, the printing apparatus 130 can receive a URL print request from the web application server 110, and download document data, thereby preparing for printing.

(Printing Processing)

A fifth sequence will be described next with reference to a flowchart shown in FIG. 15. In the fifth sequence, the web application server 110 responds to the printing apparatus 130 by generating a print response to a print request query from the printing apparatus 130. The printing apparatus 130 executes URL printing. In the URL printing, the printing apparatus 130 downloads document data from the designated URL, and prints it by, for example, PDF direct printing. The PDF direct printing means a function with which a printing apparatus can directly print document data without a printer driver, as shown in FIG. 16. However, the printing apparatus 130 need not always be compatible with PDF direct printing, and can also print document data via the RIP 312 after the control API 136 converts it into a format that can be printed by the PDL manager 139.

The fifth sequence is repeated at a predetermined cycle upon power-on. The predetermined cycle is not particularly limited, and a predetermined value may be held at the time of manufacture in advance or the owner of the printing apparatus may arbitrarily set this cycle. In step S5001, the printing apparatus 130 repeats the processes in steps S5002 to S5018. In step S5002, the web service requester unit 134 of the printing apparatus 130 sends a print request query to the web application server 110. The print request query contains the printing apparatus ID.

In step S5003, the web service provider unit 114 of the web application server 110 receives the print request query from the web service requester unit 134 of the printing apparatus 130. The web service provider unit 114 of the web application server 110 invokes the request table management unit 116. The request table management unit 116 looks up the request table 500. In step S5004, the request table management unit 116 of the web application server 110 determines whether a print request associated with the ID of the printing apparatus which has sent the print request query is present in the request table 500. If YES is determined in step S5004, the process advances to step S5005; or if NO in step S5004, the process advances to step S5008.

In step S5005, the web service provider unit 114 of the web application server 110 invokes the bibliographic information table management unit 115. The bibliographic information table management unit 115 determines whether the URL has been registered in the bibliographic information of the document data ID registered in the request table 500. The URL is registered when the storage client apparatus 120 uploads data into the data management unit 113 of the web application server 110 by the fourth sequence. Therefore, by determining whether the URL has been registered, it can be determined whether a document for which a print request is issued has been uploaded into the data management unit 113 of the web application server 110. If YES is determined in step S5005, the request table management unit 116 of the web application server 110 advances the process to step S5006; or if NO is determined in step S5005, it advances the process to step S5007.

In step S5006, the web service provider unit 114 of the web application server 110 generates a print response. The print response contains a character string indicating that the request type is a print request, and the URL to which document data is downloaded. In step S5007, the web service provider unit 114 of the web application server 110 generates a None response. The None response means a response indicating that no request to the printing apparatus 130 is present. In step S5008, the web service provider unit 114 of the web application server 110 generates a None response, like step S5007.

In step S5009, the web service provider unit 114 of the web application server 110 sends the response generated in step S5006, S5007, or S5008 to the web service requester unit 134 of the printing apparatus 130. Thus, a print request notification means is implemented. In step S5010, the web service requester unit 134 of the printing apparatus 130 receives the response. In step S5011, the web service requester unit 134 of the printing apparatus 130 determines whether the received response is a print response. If YES is determined in step S5011, the process advances to step S5012; or if NO is determined in step S5011, the process advances to step S5018.

In step S5012, the web service requester unit 134 of the printing apparatus 130 sends a document data request to the download destination URL on the web application server 110, contained in the print response. The document data request is, for example, a request to get an HTTP protocol for a URI. In step S5013, the web service provider unit 114 of the web application server 110 receives the document data request from the web service requester unit 134 of the printing apparatus 130. In step S5014, the web service provider unit 114 of the web application server 110 sends data to the web service requester unit 134 of the printing apparatus 130.

In step S5015, the web service provider unit 114 of the web application server 110 deletes the document data and deletes its URL from the bibliographic information table. This step is executed because the web application server 110 need not hold the document data after its sending. However, the sequence of processing in which the document data is not deleted assuming that it is printed a plurality of times may also be adopted. In step S5016, the web service requester unit 134 of the printing apparatus 130 receives data from the web service provider unit 114 of the web application server 110. In step S5017, the print manager 138 of the printing apparatus 130 prints the downloaded document by, for example, PDF direct printing. In step S5018, the printing apparatus 130 returns the process to step S5002. The process in step S5015 may be executed after printing processing (S5017) in the printing apparatus 130 is completed.

As has been described above, in the fifth sequence, the web application server 110 responds to the printing apparatus 130 by generating a print response when a print request to the printing apparatus 130 is present in the request table, in response to a print request query from the printing apparatus 130.

Second Embodiment

Figure 17:
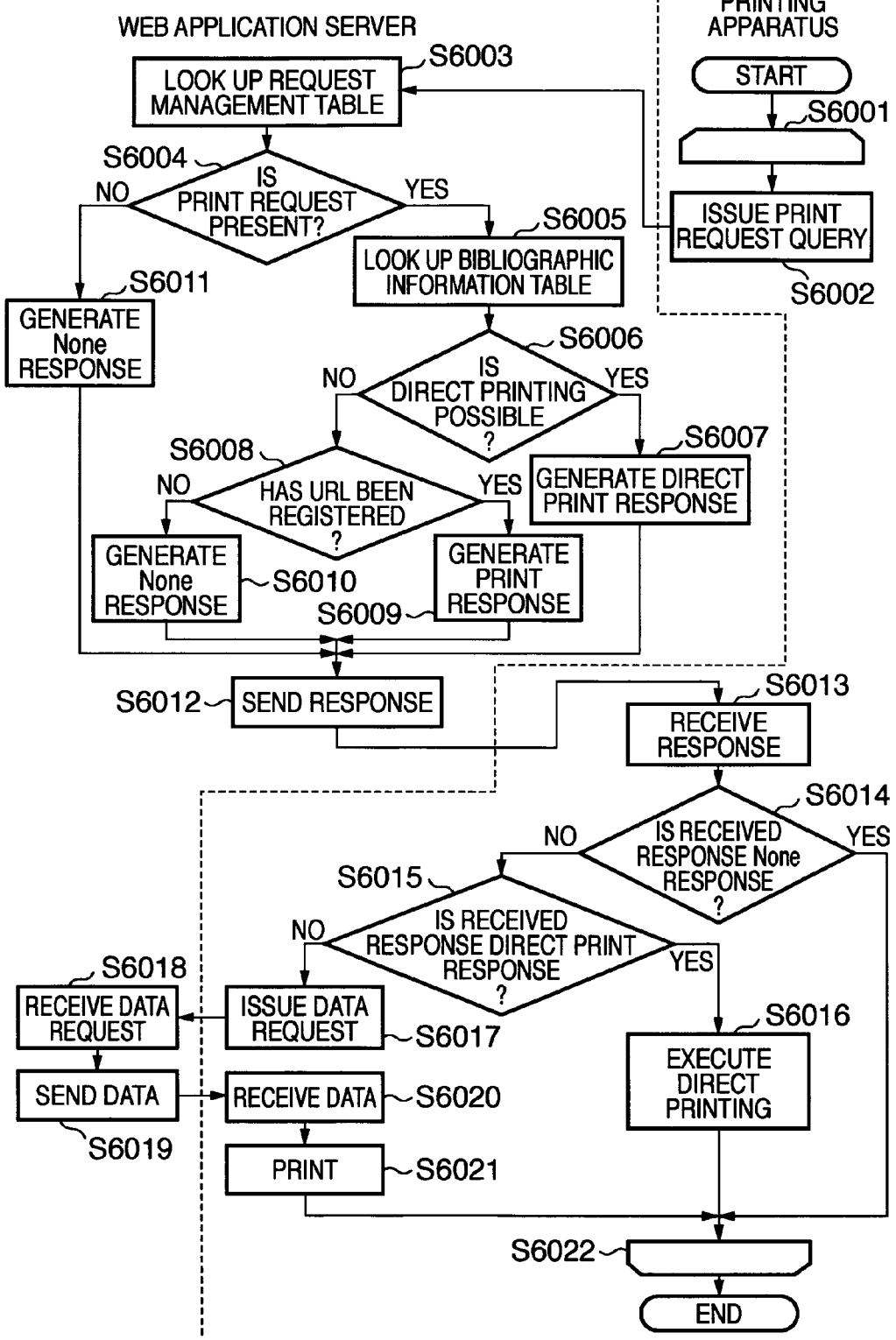
FIG. 17 is a flowchart showing the sequence of directly printing document data according to the second embodiment.

Processing for sending a direct print response from a web application server 110 to a printing apparatus 130 in this embodiment will be described below with reference to a flowchart shown in FIG. 17. The direct print response means a response sent by the web application server 110 when the printing apparatus 130 and a storage client apparatus 120 are the same apparatus. Only differences from the first embodiment will be described below in relation to a configuration in which a document can be printed without being uploaded into the web application server 110 when it is stored in the printing apparatus 130, in response to a direct print response.

Figure 15:
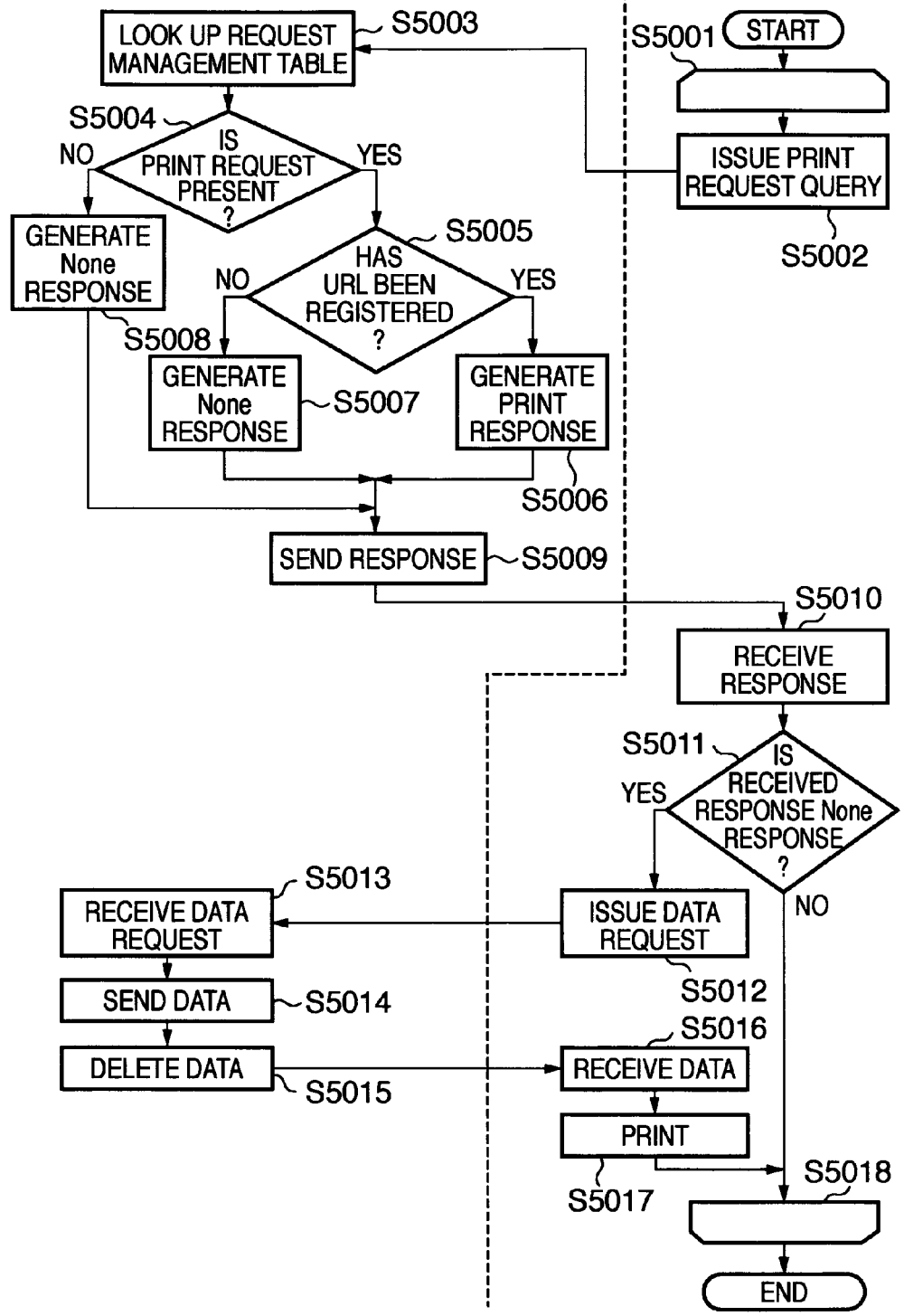
FIG. 15 is a flowchart showing the sequence of executing URL printing of document data according to the first embodiment.

The processes in steps S6001 to S6004 are the same as in steps S5001 to S5004, respectively, in the fifth sequence shown in FIG. 15, and a description thereof will not be given. In step S6005, a web service provider unit 114 of the web application server 110 invokes a bibliographic information table management unit 115. The bibliographic information table management unit 115 specifies the ID of a storage client apparatus, which stores document data for which a print request is issued, by looking up a bibliographic information table 600. The bibliographic information table management unit 115 sends back the specified storage client apparatus ID to the web service provider unit 114.

In step S6006, the web service provider unit 114 of the web application server 110 compares the storage client apparatus ID specified in step S6005 with the printing apparatus ID that is the print request destination, and determines that direct printing is possible if these IDs coincide with each other. If it is determined that direct printing is possible, the process advances to step S6007; or if it is determined that direct printing is impossible, the process advances to step S6008. In step S6007, the web service provider unit 114 of the web application server 110 generates a direct print response. The direct print response contains a character string indicating that the request type is a direct print request, and the document data ID. The processes in steps S6008 to S6013 are the same as in steps S5005 to S5010, respectively, in the fifth sequence shown in FIG. 15, and a description thereof will not be given.

In step S6014, a web service requester unit 134 of the printing apparatus 130 determines whether the response is a None response. If YES is determined in step S6014, the process advances to step S6022; or if NO is determined in step S6014, the process advances to step S6015. In step S6015, the web service requester unit 134 of the printing apparatus 130 determines whether the response is a direct print response. If YES is determined in step S6015, the process advances to step S6016; or if NO is determined in step S6015, the process advances to step S6017. In step S6016, the printing apparatus 130 prints. The direct print response contains the document data ID. The printing apparatus 130 invokes a data management unit 113 to read out document data corresponding to the document data ID, and prints it using a print manager 138. The processes in steps S6017 to S6022 are the same as in steps S5012 to S5018, respectively, in the fifth sequence, and a description thereof will not be given.

As has been described above, in the processing shown in FIG. 17, a document can be printed without being uploaded into the web application server 110 when it is stored in the printing apparatus 130. In the foregoing way, printing can be executed without wasting an external memory 209 of the web application server 110.

Third Embodiment

Processing for generating a document list screen with printing limitations from a web application server 110 to a host computer 140 in this embodiment will be described below with reference to FIGS. 12, 14, 18A, and 18B. Because documents displayed on the document list screen are stored on a storage client apparatus 120 in practice, they cannot be printed if the storage client apparatus 120 is unavailable due to a breakdown or a network failure. The document list screen with printing limitations is used to prohibit the user from selecting data that cannot be printed. Only differences from the first embodiment will be described below in relation to a configuration according to the third embodiment.

The web application server 110 includes a storage client apparatus table management unit 118 and a storage client apparatus table 1200 shown in FIG. 18B, in addition to the configuration in the first embodiment. In step S4003 of a flowchart shown in FIG. 14, a web service provider unit 114 of the web application server 110 receives an upload request query from the storage client apparatus 120. The web service provider unit 114 invokes the storage client apparatus table management unit 118. The storage client apparatus table management unit 118 stores the query time of day in the storage client apparatus table 1200 in association with the storage client apparatus ID.

In step S3002 in the flowchart shown in FIG. 12, a web server unit 111 of the web application server 110 invokes an application server unit 112. The application server unit 112 generates HTML data of a document list screen with printing limitations, and sends it back to the web server unit 111. The web server unit 111 sends the above-mentioned HTML data to a web browser. At this time, the application server unit 112 invokes the storage client apparatus table management unit 118 to prohibit the user from instructing to print a document stored in a storage client apparatus 120 which is previously accessed at a time of day earlier than a predetermined threshold. For example, a print button 1101 is disabled so that the user cannot click it.

As has been described above, a document list screen with printing limitations can be generated in the third embodiment. The document list screen with printing limitations can prevent the user from selecting a document that cannot be printed.

Fourth Embodiment

Processing for generating a printing apparatus selection screen with printing limitations from a web application server 110 to a host computer 140 in this embodiment will be described below with reference to FIGS. 12, 15, and 19. A printing apparatus displayed on the printing apparatus selection screen is registered in the first sequence in advance. However, a printing apparatus 130 cannot print if it is unavailable due to a breakdown or a network failure. That is, if no query is issued from a certain printing apparatus a predetermined time after another query is issued from this printing apparatus, this printing apparatus is regarded as having a certain usage limitation. The printing apparatus selection screen with printing limitations is used to prohibit the user from selecting a printing apparatus that cannot print. Only differences from the first embodiment will be described below in relation to a configuration according to the fourth embodiment.

In step S5003 of the flowchart shown in FIG. 15, a web service provider unit 114 of the web application server 110 receives a print request query from the printing apparatus 130. The web service provider unit 114 invokes a printing apparatus table management unit 117. The printing apparatus table management unit 117 stores the query time of day in a printing apparatus table 400 in association with the printing apparatus ID.

In step S3005 of the flowchart shown in FIG. 12, a web server unit 111 of the web application server 110 invokes an application server unit 112. The application server unit 112 generates HTML data of a printing apparatus list screen with printing limitations, and sends it back to the web server unit 111. The web server unit 111 sends the above-mentioned HTML data to a web browser. At this time, the application server unit 112 invokes the printing apparatus table management unit 117 to prohibit the user from instructing to print a document stored in a printing apparatus 130 which is previously accessed at a time of day earlier than a predetermined threshold. That is, the use of a printing apparatus from which no query is issued within a predetermined time with reference to the previous query time of day is limited. For example, a check box 1201 is disabled so that the user cannot click it.

As has been described above, in the fourth embodiment, a printing apparatus selection screen with printing limitations can be generated. The printing apparatus selection screen with printing limitations can prevent the user from selecting a printing apparatus 130 that cannot print.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A printing system, comprising:
a web application server configured to hold data in a storage area and which is charged out as a sum of money in proportion to an amount of usage of the storage area;
a storage client apparatus having:
a providing unit configured to provide bibliographic information of data stored in the storage client apparatus to the web application server, and
a storage client query unit configured to inquire the web application server of a print instruction to print data stored in the storage client apparatus, wherein the providing unit further is configured to provide data, to be stored in the storage client apparatus, to the web application server in response to a server provision request from the web application server when the print instruction is acquired by the storage client query unit;
a printing apparatus having:
a print request query unit configured to inquire the web application server of a print request to the printing apparatus, and
a printing unit configured to acquire and print corresponding data based on information described in the print request when the print request is acquired by the print request query unit,
wherein the web application server includes:
a storage client apparatus management unit configured to manage information of the storage client apparatus,
a printing apparatus management unit configured to manage information of the printing apparatus,
a bibliographic information management unit configured to manage bibliographic information of the data,
a sending unit configured to send display data used to display the bibliographic information of the data to a user client apparatus operated by a user,
a request management unit configured to manage, in response to a user print request issued from the user client apparatus to the printing apparatus to print the data stored in the storage client apparatus, a data provision request to the storage client apparatus and a user print request to the printing apparatus,
a data provision request notification unit configured to notify, in response to a query for the data provision request issued by the storage client query unit, the storage client apparatus of the data provision request and storage location information if the data provision request to the storage client apparatus is held in the request management unit,
an addition unit configured to add the storage location information of the data to be printed to the bibliographic information of the data when the data is provided from the storage client apparatus, and
a print request notification unit configured to notify, in response to a query for the print request issued by the print request query unit of the printing apparatus, the printing apparatus of the print request and storage location information of the data if the print request to the printing apparatus is held in the request management unit.

2. The printing system according to claim 1, wherein the web application server uses the request management unit to manage a direct print request to the printing apparatus if the storage client apparatus and the printing apparatus are an identical apparatus by referring to the storage client apparatus management unit and the printing apparatus management unit when a print request is issued from the user client apparatus to the printing apparatus to print the data stored in the storage client apparatus, and the printing apparatus prints data held in the printing apparatus if result obtained by the print request query unit is the direct print request.

3. The printing system according to claim 1, wherein the web application server deletes the data and the storage location information, which is added by the addition unit and managed by the bibliographic information management unit, after execution of printing processing by the printing unit of the printing apparatus.

4. The printing system according to claim 1, wherein
the web application server uses the storage client apparatus management unit to manage a time of day of a print request query from the storage client query unit, and
the sending unit to send display data which prohibits a print instruction to print data stored in the storage client apparatus earlier than a predetermined threshold with reference to the time of day of the query from the storage client apparatus.

5. The printing system according to claim 1, wherein
the web application server uses the printing apparatus management unit to manage a time of day of a print request query from the print request query unit of the printing apparatus, and
the sending unit to send display data which prohibits a print instruction to the printing apparatus which issues no query for the print request within a predetermined threshold from a previous query.

6. The printing system according to claim 1, wherein the storage location information contains a Uniform Resource Locator indicating a location in which the data is stored.

7. The printing system according to claim 1, wherein, when document data is stored in the storage client apparatus, bibliographic information of that document data is explicitly uploaded into the web application server.

8. The printing system according to claim 1, wherein, when document data is stored in the storage client apparatus and in response to determining that the storage client apparatus is not provided with a web browser, the providing unit of the storage client apparatus automatically uploads bibliographic information of that stored document data the web application server.

9. The printing system according to claim 1, wherein the web application server decides responses to request queries from the storage client apparatus and the printing apparatus based on a request table of the request management unit in the web application server having registered therein an upload request to the storage client apparatus and a print request to the printing apparatus.

10. The printing system according to claim 1, wherein, in response to a request to print data being present in the storage client apparatus, the storage client apparatus uploads document data into the web application server and register, as bibliographic information, a uniform resource locator (URL) of the document data in a bibliographic information table of the bibliographic information management unit in the web application server.

11. The printing system according to claim 1, wherein, in response to receiving a print request query from the print request query unit in the printing apparatus and a print request to the printing apparatus being present in a request table managed by the request table management unit in the web application server, the web application server generates a print response and sends the generated print response to the printing apparatus.

12. The printing system according to claim 11, wherein, in response determining that a print request to the printing apparatus being present in a request table, a web service provider unit of the web application server determines whether direct printing is possible by comparing a storage client apparatus identification (ID) with a printing apparatus ID that is a destination of the print request.

13. The printing system according to claim 12, wherein, in response to determining that direct printing is impossible and that a uniform resource locator (URL) of document data is not registered in a bibliographic information table of the bibliographic information management unit in the web application server, the web application server generates a None response as a response indicating that no request to the printing apparatus is present.

14. A web application server in a printing system including the web application server which holds data in a storage area and which is charged out as a sum of money in proportion to an amount of usage of the storage area, a storage client apparatus, and a printing apparatus, the web application server comprising:
a storage client apparatus management unit configured to manage information of the storage client apparatus;
a printing apparatus management unit configured to manage information of the printing apparatus;
a bibliographic information management unit configured to manage bibliographic information of the data;
a sending unit configured to send display data used to display the bibliographic information of the data to a user client apparatus operated by a user;
a request management unit configured to manage, in response to a user print request issued from the user client apparatus to the printing apparatus to print the data stored in the storage client apparatus, a data provision request to the storage client apparatus and a user print request to the printing apparatus;
a data provision request notification unit configured to notify, in response to a query for the data provision request issued by the storage client query unit, the storage client apparatus of the data provision request and storage location information if the data provision request to the storage client apparatus is held in the request management unit;
an addition unit configured to add the storage location information of the data to be printed to the bibliographic information of the data when the data is provided from the storage client apparatus; and
a print request notification unit configured to notify, in response to a query for the print request issued by the print request query unit of the printing apparatus, the printing apparatus of the print request and storage location information of the data if the print request to the printing apparatus is held in the request management unit.

15. A control method in a printing system including a web application server configured to hold data in a storage area and which is charged out as a sum of money in proportion to an amount of usage of the storage area, a storage client apparatus, and a printing apparatus, the control method comprising:
providing, using the storage client apparatus, bibliographic information of data stored in the storage client apparatus to the web application server;
inquiring, using the storage client apparatus, the web application server of a print instruction to print data stored in the storage client apparatus, wherein providing further includes providing data, to be stored in the storage client apparatus, to the web application server in response to a server provision request from the web application server when the print instruction is acquired through the inquiring;

inquiring, using the printing apparatus, the web application server of a print request to the printing apparatus;

acquiring and printing, using the printing apparatus, corresponding data based on information described in the print request when the print request is acquired;

managing, using the web application server, information of the storage client apparatus;

managing, using the web application server, information of the printing apparatus;

managing, using the web application server, bibliographic information of the data;

sending, using the web application server, display data used to display the bibliographic information of the data to a user client apparatus operated by a user;

managing, using the web application server and in response to a user print request issued from the user client apparatus to the printing apparatus to print the data stored in the storage client apparatus, a data provision request to the storage client apparatus and a user print request to the printing apparatus;

notifying, using the web application server and in response to an issued query for the data provision request, the storage client apparatus of the data provision request and storage location information if the data provision request to the storage client apparatus is held in the web application server;

adding, using the web application server, the storage location information of the data to be printed to the bibliographic information of the data when the data is provided from the storage client apparatus; and notifying, using the web application server and in response to a query for the print request issued by the printing apparatus, the printing apparatus of the print request and storage location information of the data if the print request to the printing apparatus is held in the web application server.

16. A non-transitory computer-readable medium storing a program that causes a printing system to perform the control method according to claim 15.

* * * * *